(12) United States Patent
Takeda et al.

(10) Patent No.: US 12,426,019 B2
(45) Date of Patent: Sep. 23, 2025

(54) TERMINAL, RADIO COMMUNICATION METHOD, AND BASE STATION

(71) Applicant: NTT DOCOMO, INC., Tokyo (JP)

(72) Inventors: Daiki Takeda, Tokyo (JP); Shinya Kumagai, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 440 days.

(21) Appl. No.: 17/907,744

(22) PCT Filed: Mar. 31, 2020

(86) PCT No.: PCT/JP2020/014956
§ 371 (c)(1),
(2) Date: Sep. 29, 2022

(87) PCT Pub. No.: WO2021/199357
PCT Pub. Date: Oct. 7, 2021

(65) Prior Publication Data
US 2023/0345430 A1     Oct. 26, 2023

(51) Int. Cl.
*H04W 72/0446*     (2023.01)
*H04L 5/00*     (2006.01)
(Continued)

(52) U.S. Cl.
CPC ....... *H04W 72/0446* (2013.01); *H04L 5/0053* (2013.01); *H04W 4/70* (2018.02);
(Continued)

(58) Field of Classification Search
CPC ... H04W 72/0446; H04W 72/02; H04W 4/70; H04L 5/0023; H04L 5/005; H04L 5/0053
See application file for complete search history.

(56) References Cited

U.S. PATENT DOCUMENTS

| | | | |
|---|---|---|---|
| 2014/0301305 A1 | 10/2014 | Xu et al. | |
| 2018/0324740 A1* | 11/2018 | Edge | H04W 64/00 |
| 2020/0314851 A1* | 10/2020 | Vaidya | H04L 1/0061 |

FOREIGN PATENT DOCUMENTS

| | | | | |
|---|---|---|---|---|
| CN | 105379336 A | * | 3/2016 | H04L 5/14 |
| JP | 2016-519892 A | | 7/2016 | |

OTHER PUBLICATIONS

English translation of CN-105379336-A, 2016, Retrieved from PE2E Search on May 20, 2025 (Year: 2016).*

(Continued)

*Primary Examiner* — Omar J Ghowrwal
(74) *Attorney, Agent, or Firm* — Osha Bergman Watanabe & Burton LLP

(57) ABSTRACT

A terminal according to one aspect of the present disclosure includes a control section that determines a periodicity different from a second periodicity of at least one of a synchronization signal block, a control resource set (CORESET) 0, a physical downlink shared channel for carrying a system information block 1, an update of a physical broadcast channel in the synchronization signal block, and an update of the system information block 1, for a second terminal, the second terminal having at least one of a second bandwidth wider than a bandwidth of the terminal and a second number of antennas greater than the number of antennas of the terminal, and a receiving section that performs reception based on the periodicity. According to one aspect of the present disclosure, initial access can be appropriately performed.

5 Claims, 23 Drawing Sheets

| Index | SS/PBCH block and CORESET multiplexing pattern | Number of RBs | Number of Symbols | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

(51) Int. Cl.
  *H04W 4/70*  (2018.01)
  *H04W 72/02* (2009.01)
(52) U.S. Cl.
  CPC .......... *H04W 72/02* (2013.01); *H04L 5/0023* (2013.01); *H04L 5/005* (2013.01)

(56) References Cited

OTHER PUBLICATIONS

International Search Report for corresponding International Application No. PCT/JP2020/014956, mailed Nov. 17, 2020 (5 pages).
Written Opinion for corresponding International Application No. PCT/JP2020/014956, mailed Nov. 17, 2020 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

| Index | SS/PBCH block and CORESET multiplexing pattern | Number of RBs | Number of Symbols | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

FIG. 1

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G plus (+)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

3GPP Rel. 15 defines the bandwidth (for example, mandatory BW) and the like at least required for UEs to communicate. On the other hand, terminals supporting various use cases such as IoT are assumed to be introduced in future radio communication systems (for example, Rel. 17 or later versions).

Depending on the use case, it is conceivable that the bandwidth defined in Rel. 15 may not be necessarily required for the UEs. It is not clear, however, how UEs having different bandwidths perform an initial access. When an initial access is not appropriately performed, system performance may be degraded, for example, throughput is reduced.

Therefore, an object of the present disclosure is to provide a terminal which can perform an initial access appropriately, a radio communication method, and a base station.

Solution to Problem

A terminal according to one aspect of the present disclosure includes a control section that determines a periodicity different from a second periodicity of at least one of a synchronization signal block, a control resource set (CORESET) 0, a physical downlink shared channel for carrying a system information block 1, an update of a physical broadcast channel in the synchronization signal block, and an update of the system information block 1, for a second terminal, the second terminal having at least one of a second bandwidth wider than a bandwidth of the terminal and a second number of antennas greater than the number of antennas of the terminal, and a receiving section that performs reception based on the periodicity.

Advantageous Effects of Invention

According to one aspect of the present disclosure, an initial access can be appropriately performed.

BRIEF DESCRIPTION OF DRAWINGS

FIG. 1 is a diagram to illustrate an example of a CORESET 0 configuration table;

DESCRIPTION OF EMBODIMENTS

<Use Case>

Figure 2:
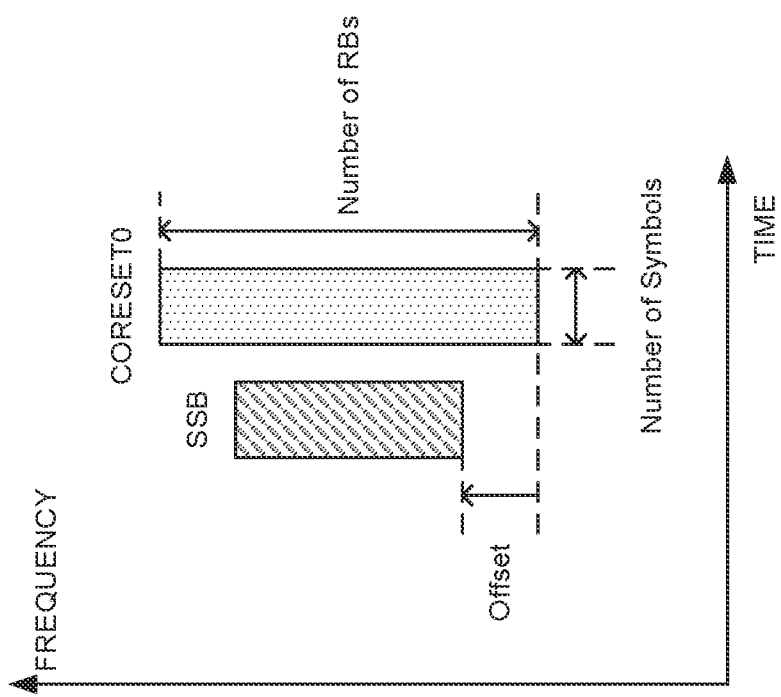
FIG. 2 is a diagram to illustrate an example of an SSB and a CORESET 0.

In future radio communication systems (for example, 3GPP Rel. 17 or later versions), it is assumed that communication systems introduced in NR (for example, Rel. 15) will be used in use cases such as IoT. With regard to IoT use cases, for example, in addition to conventional IoT use cases (e.g., using LTE terminals) such as smart homes, smart water, electric meters, and smart signals, application to new use cases is also being considered.

New use cases may be, for example, Industry Wireless Sensor NW (IWSN), video surveillance systems, wearable devices, and so on.

It is also assumed that the condition or capability required for a terminal applied to these use cases (for example, terminal capability, UE capability or requirements) is more relaxed (reduced) than the condition or capability required for a device defined or supported by Rel. 15 (for example, NR devices, also referred to as NR terminals). A device whose terminal capability is more relaxed than an NR device may be referred to as a relaxed capability NR device, a reduced capability NR device, an NR-Light device, an NR-Light terminal, an NR-Light, an NR light, an NR-Light UE, etc. In the following description, a device whose terminal capability is more relaxed than an NR device is referred to as an NR-Light device, but may be referred to by other names.

The NR-Light device may be configured to include a smaller number of transmitting antennas and receiving antennas than those of the NR device. In addition, the NR-Light device may be configured to have a bandwidth, which is used for communication, smaller or narrower than that of the NR device (Bandwidth reduction).

Rel. 15 requires a UE (NR device and existing UE) to support a given bandwidth depending on its frequency range (for example, FR1, FR2) and subcarrier spacing. The bandwidth that a UE needs to support may be referred to as a mandatory bandwidth or a mandatory BW.

For example, in a first frequency range (Frequency Range 1 (FR1)), a UE needs to support a bandwidth of approximately 100 MHz for subcarrier spacings of 30 KHz and 60 KHz and a bandwidth of approximately 50 MHz for a subcarrier spacing of 15 KHz. Also, in a second frequency range ((Frequency Range 2 (FR2), the UE needs to support a bandwidth of approximately 200 MHz for subcarrier spacings of 60 KHz and 120 KHz.

On the other hand, it is conceivable that the bandwidth supported by an NR-Light device (for example, a mandatory bandwidth) is set to be narrower than the bandwidth supported by a Rel. 15 UE. That is, the size of bandwidth supported by the NR-Light device may be smaller compared to that supported by the NR device. This can reduce the load on signal reception processing or transmission processing in the NR-Light device.

In order to reduce complexity of the NR-Light device, the followings are being considered:
The reduction of the number of antennas for at least one of reception and transmission of a UE;
The reduction of a UE bandwidth;
The band of a Synchronization Signal (SS)/Physical Broadcast CHannel (PBCH) Block (Synchronization Signal Block (SSB)) of Rel. 15 is reused to minimize Layer 1 (L1) changes;
Half duplex Frequency Division Duplex (FDD);
Relaxed UE processing time; and
Relaxed UE processing capability.

Furthermore, the followings are considered: that these should not overlap with low power wide area (LPWA) use cases; that the lowest capability will be no less than an LTE Category 1bis modem; that coexistence with a Rel. 15 UE and a Rel. 16 UE will be ensured; that standalone mode and single connectivity are focused on, and so on.

<CORESET 0>

In Rel. 15 NR, a plurality of CORESET 0 configuration tables (a plurality of CORESET 0 configuration information sets) for configuring a CORESET 0 are defined in the specifications. Each table (CORESET 0 configuration information set) includes a plurality of rows (a plurality of CORESET 0 configuration information) (FIG. 1). Each row includes at least one parameter (column) of the index of the row, the SS/PBCH block and CORESET multiplexing pattern, the number of Resource Blocks (RBs) in CORESET 0, the number of symbols in CORESET 0, and offset to the smallest RB index of the SSB (the smallest RB index of the common RB overlapping with the first index of the SSB) with respect to the smallest RB index of CORESET 0 (FIG. 2).

In the present disclosure, a "CORESET 0 configuration information set" and a "CORESET 0 configuration table" may be interchangeably interpreted. In the present disclosure, a "C ORESET 0 configuration information" and a "row of a CORESET 0 configuration table" may be interchangeably interpreted.

A plurality of CORESET 0 configuration tables are associated with at least one of an SSB SCS, a PDCCH (CORESET 0) SCS, and a frequency band (of an SSB). The frequency band may be associated with the minimum channel bandwidth. The UE determines the CORESET 0 configuration table associated with at least one of an SSB SCS, a PDCCH SCS and a frequency band from the plurality of CORESET 0 configuration tables.

A Minimum Information Block (MIB) carried on a PBCH in an SSB includes PDCCH configuration information for an SIB 1 (pdcch-ConfigSIB1) for configurating a PDCCH for the SIB 1. The PDCCH configuration information for the SIB 1 includes a CORESET 0 configuration index (controlResoureSetZero) for configuring CORESET 0, and a search space 0 configuration index (searchSpaceZero) for configurating a Type 0-PDCCH CSS set (search space 0). The CORESET 0 configuration index corresponds to an index (for example, one of 0, 1, . . . , 15) of a row in the CORESET 0 configuration table.

The UE uses the row with an index indicated in the CORESET 0 configuration index from the determined CORESET 0 configuration table to determine the time and frequency positions of CORESET 0 (at least one of the temporal position where CORESET 0 is located, the density, the temporal width, the frequency width, and the relative frequency position with respect to the SSB).

In Rel. 15, the bandwidth of CORESET 0 is not limited to the bandwidth of an SSB. Due to bandwidth reduction, a new UE may not receive a signal having a bandwidth equal to or wider than a mandatory bandwidth of a Rel. 15 UE, or may not receive a signal having a bandwidth wider than the SSB bandwidth. When CORESET 0 is configured with a CORESET 0 configuration index in the PDCCH configuration information for the SIB 1 included in the MIB, coexistence with a Rel. 15 UE and a Rel. 16 UE (existing UE), and an NR-Light device (new UE) should be ensured.

The following studies 1 and 2 were done on an LTE-based low complexity device (for example, enhanced Machine Type Communication (eMTC)).

[Study 1]

The UE bandwidth of eMTC is restricted within a bandwidth (BW) of 6 PRBs. A Synchronization Signal (SS)/MIB is transmitted within a bandwidth of 6 PRBs at the center of an LTE carrier, and reused for an eMTC UE. An SIB 1-bandwidth reduced (BR), which is the SIB 1 defined only for a bandwidth reduced low complexity (BL) UE, is configured by scheduling information carried on the MIB.

[Study 2]

eMTC supports UE BW reduction and reduction of the number of antennas. It is assumed that reduction of the number of receiving antennas results in lower coverage performance with respect to an eMTC UE. Therefore, coverage enhancement based on repetition transmission is supported for a machine type communication PDCCH (MPDCCH)/PDSCH. Application of coverage enhancement is necessary for an SIB 1-BR PDCCH/PDSCH. Then, an MIB (schedulingInfoSIB1-BR-r13) can set resource setting and repetition level (count) for the SIB 1 PDCCH.

Considering an existing LTE device, UE BW reduction and reduction of the number of transmitting (Tx)/receiving (Rx) antennas are also assumed in an NR-based IoT device. Here, the following problems 1 and 2 are conceivable.

[Problem 1]

Some channels/signals may be necessary for supporting the limited UE bandwidth.

For example, a Rel. 15 NR supports the CORESET #0 configuration for a narrow CORESET BW (for example, 24 PRBs). However, an NR BL UE may not monitor CORESET #0. For example, an SIB 1 PDSCH (PDSCH carrying the SIB 1) can be limited to the CORESET #0 bandwidth. The UE may not monitor the SIB 1 PDSCH according to the CORESET #0 configuration and SIB 1 PDSCH scheduling.

[Problem 2]

Due to complexity reduction, coverage enhancement may need to be supported in some signals/channels.

When the category or capability of a new UE for a single receive antenna is supported for an NR BL UE and a double receive antenna is assumed in an existing UE, it is conceivable that coverage enhancement on the order of +3 dB will be necessary, for example, at least for each initial access channel.

An NR bandwidth reduced low complexity (BL) UE may support a UE bandwidth wider than 20 PRBs in order to reuse existing SSBs.

Hence, the initial access for an NR BL UE is not clear. When an initial access is not done appropriately, a method for accessing an appropriate cell is not provided, and NR communication may not be established.

Then, the inventors of the present invention came up with an initial access method for a band limited UE.

Embodiments according to the present disclosure will be described in detail with reference to the drawings as follows. The radio communication method according to each embodiment may be employed independently or may be employed in combination.

(Radio Communication Method)

In the present disclosure, a "CORESET 0," "CORESET #0," a "CORESET with index 0," "DCI with CRC scrambled by SI-RNTI and a system information indicator set to 0," a "PDCCH for scheduling an SIB 1," a "CORESET associated with an SSB," a "PDCCH in CORESET 0," a "Type 0-PDCCH," an "RMSI CORESET," and an "RMSI PDCCH" may be interchangeably interpreted.

In the present disclosure, an "existing CORESET 0 configuration table," an "existing table," and a "CORESET 0 configuration table of Rel. 15 and Rel. 16" may be interchangeably interpreted. In the present disclosure, a "new CORESET 0 configuration table," a "new table," and a "CORESET 0 configuration table of Rel. 17 or later versions" may be interchangeably interpreted.

In the present disclosure, a "bandwidth of a terminal," a "UE bandwidth," a "minimum bandwidth," a "minimum channel bandwidth," a "minimum UE channel bandwidth," a "mandatory bandwidth," and a "mandatory BW" may be interchangeably interpreted.

In the present disclosure, an "NR non-BL UE," an "existing UE," a "UE with the minimum channel bandwidth wider than that of a new UE," a "second terminal," and an "NR device" may be interchangeably interpreted. In the present disclosure, an "NR BL UE," a "new UE," a "UE with the minimum channel bandwidth narrower than that of an existing UE," a "terminal," a "relaxed capability NR device," a "reduced capability NR device," an "NR-Light device," an "NR-Light terminal," an "NR-Light," an "NR light," and an "NR-Light UE" may be interchangeably interpreted.

Considering the limitation on the UE bandwidth, the following cases #0 to #4 are conceivable for CORESET #0 configuration for an NR BL UE.

<<Case #0>>

CORESET #0 is shared between an NR BL UE and an NR non-BL UE. An SIB 1 PDSCH is shared between the NR BL UE and the NR non-BL UE.

Figure 3:
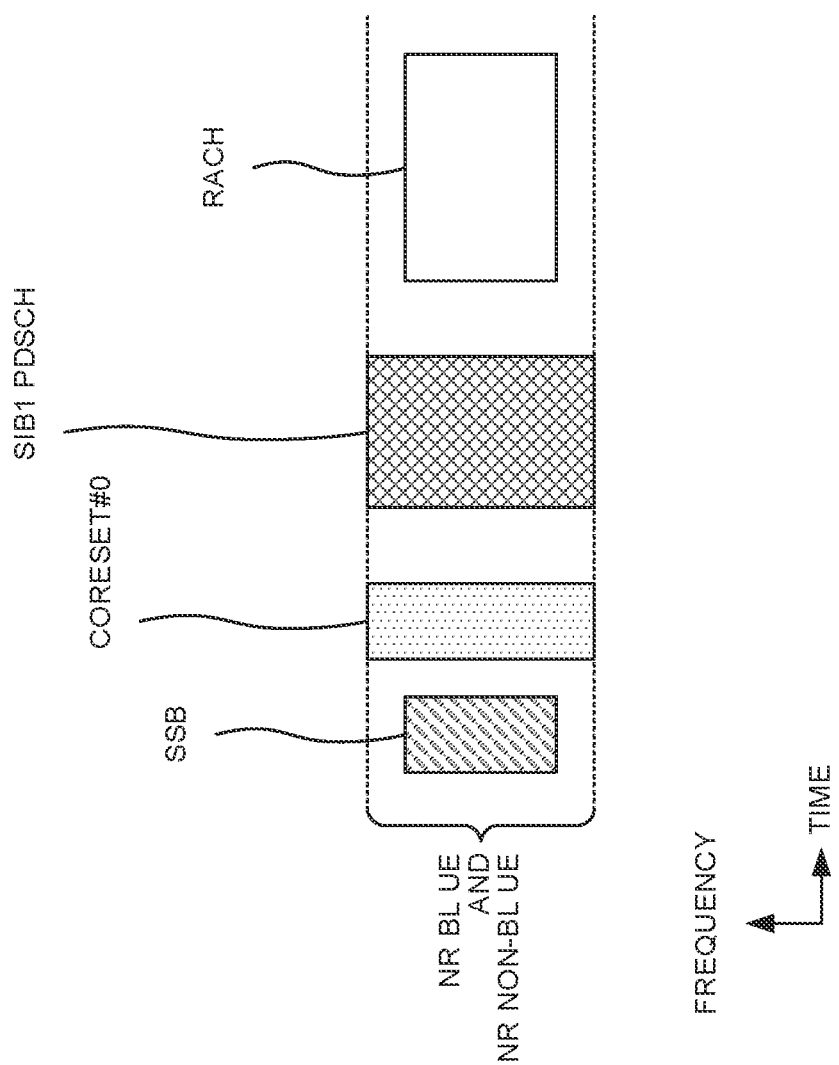
FIG. 3 is a diagram to illustrate an example of case #0.

In an example of FIG. 3, the NR non-BL UE and the NR BL UE share an SSB, CORESET #0, the SIB 1 PDSCH, and a RACH resource.

An existing NR supports this NetWork (NW) configuration. When an operator wants to deploy NR-based IoT in addition to existing NR enhanced Mobile Broad Band (eMBB), CORESET #0 needs to be set to a limited UE bandwidth. When reception performance of an SIB 1/Type 0-PDCCH is not sufficient, how to recover the reception performance becomes a problem.

The coverage recovery of the NR BL UE in case #0 will be described later in a second embodiment.

<<Case #1>>

CORESET #0 is shared between an NR BL UE and an NR non-BL UE. An SIB 1 PDSCH for the NR non-BL UE and an SIB 1 (SIB 1-BR) for the NR BL UE are separately transmitted.

Figure 4B:
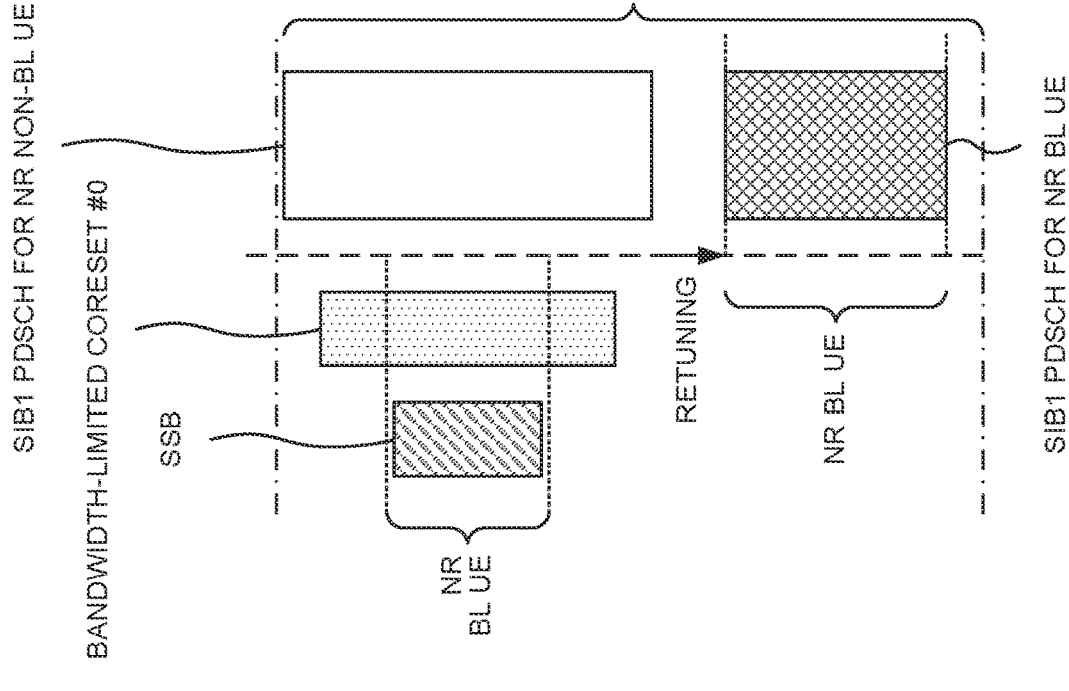
FIGS. 4A and 4B are diagrams to illustrate examples of case #1.
Figure 4A:
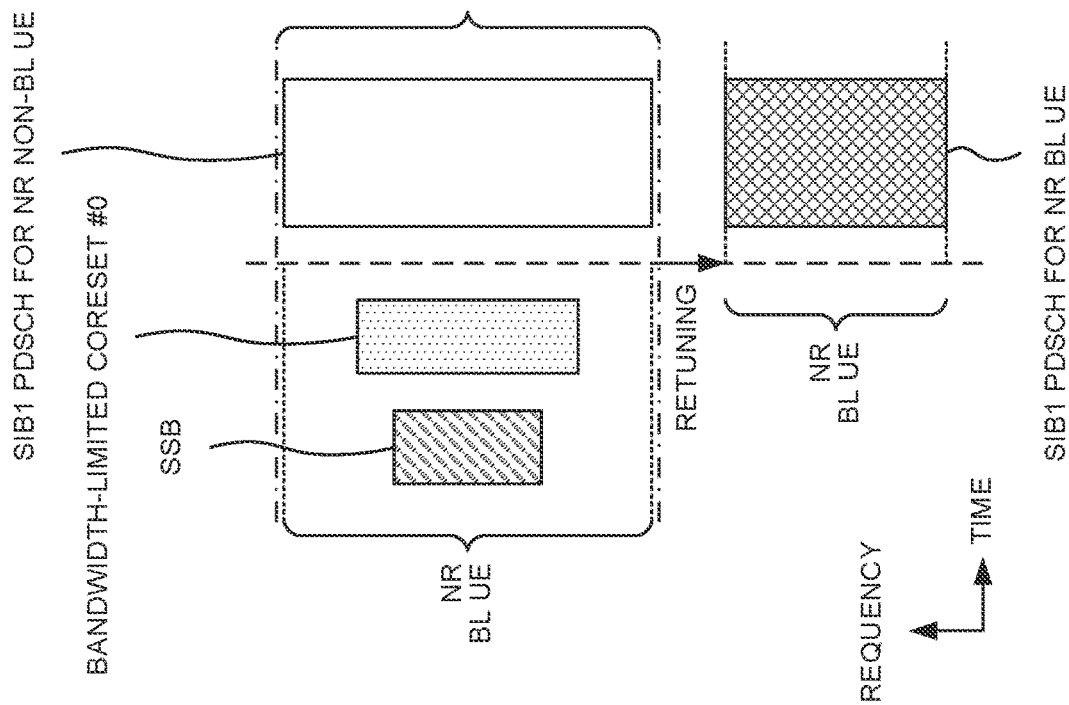

In an example of FIG. 4A, the NR non-BL UE and the NR BL UE share an SSB and CORESET #0. The SSB for the NR non-BL UE and the NR BL UE may be within a UE bandwidth for the NR BL UE. The bandwidth of CORESET #0 for the NR non-BL UE and the NR BL UE may be wider than the UE bandwidth for the NR BL UE. The NR BL UE may monitor the Type0-PDCCH within the UE bandwidth in CORESET #0. The band of the SIB 1 PDSCH for the NR BL UE may be out of a UE bandwidth for the NR non-BL UE, and out of the band of the SIB 1 PDSCH for the NR non-BL UE. In this case, the NR BL UE may receive a PDCCH in CORESET #0 before Radio Frequency (RF) retuning, and receive the SIB 1 PDSCH for the NR BL UE.

In an example of FIG. 4B, an NR non-BL UE and an NR BL UE share an SSB and CORESET #0. The band of an SIB 1 PDSCH for the NR BL UE may be within a UE bandwidth for the NR non-BL UE, and out of the band of an SIB 1 PDSCH for the NR non-BL UE. In this case, the NR BL UE may receive a PDCCH in CORESET #0 before RF retuning, and receive the SIB 1 PDSCH for the NR BL UE.

In the drawings below, a UE bandwidth for an NR non-BL UE may be wider than a UE bandwidth for an NR BL UE. In this case, the band available to the NR BL UE may be within or out of the band available to the NR non-BL UE.

The coverage recovery of the NR BL UE in case #1 will be described later in a second embodiment.

<<Case #2>>

CORESET #0 for an NR non-BL UE and CORESET #0 for an NR BL UE are separately configured. An SIB 1 PDSCH is shared between the NR BL UE and the NR non-BL UE.

Figure 5:
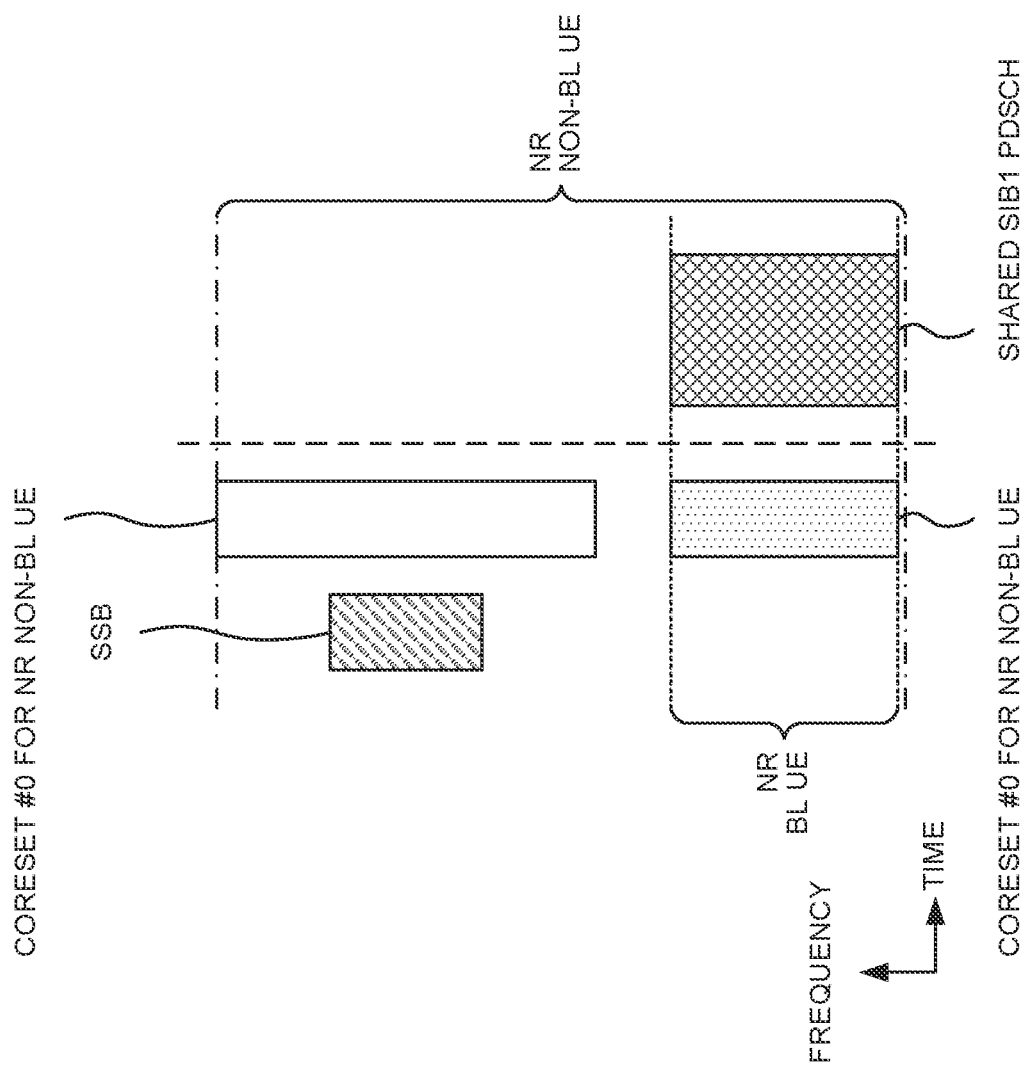
FIG. 5 is a diagram to illustrate an example of case #2.

In an example of FIG. 5, the NR non-BL UE and the NR BL UE share the SIB 1 PDSCH. For scheduling this SIB 1 PDSCH, different CORESET #0 may be configured for the NR non-BL UE and the NR BL UE. CORESET #0 for the NR BL UE may be absent.

<<Case #3>>

CORESET #0 for an NR non-BL UE and CORESET #0 for an NR BL UE are separately configured. An SIB 1 PDSCH for the NR non-BL UE and an SIB 1 (SIB 1-BR) for the NR BL UE are separately transmitted.

Figure 6:
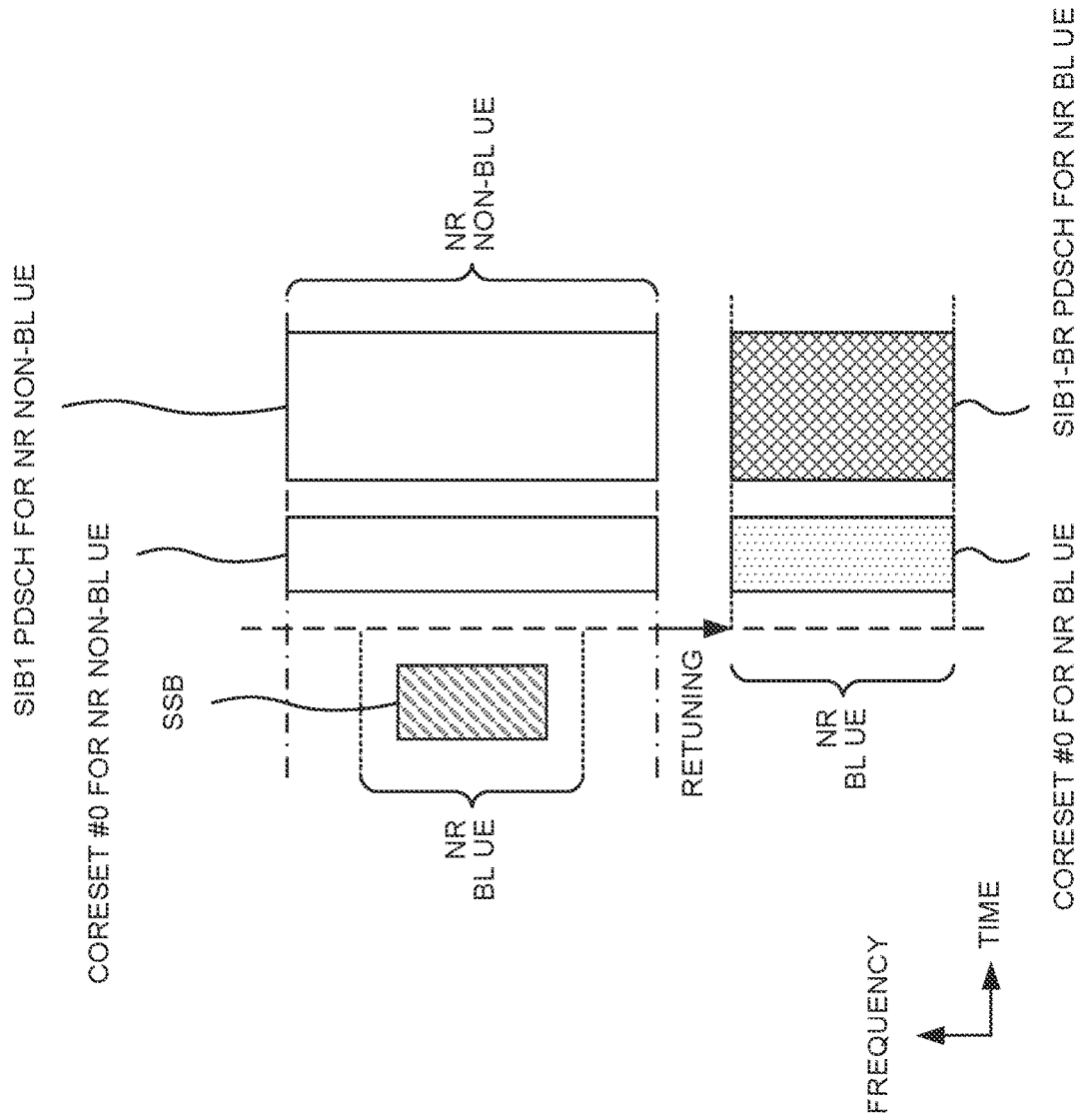
FIG. 6 is a diagram to illustrate an example of case #3.

In an example of FIG. 6, the NR non-BL UE and the NR BL UE share an SSB. The band of CORESET #0 and the SIB 1 PDSCH for the NR BL UE may be out of the band of CORESET #0 and the SIB 1 PDSCH for the NR non-BL UE. In this case, the NR BL UE may receive the SSB before RF retuning, and receive CORESET #0 and the SIB 1 PDSCH for the NR BL UE.

The scheduling is more flexible but overhead is large.

Overhead reduction in case #3 will be described later in a first embodiment.

<<Case #4>>

A new signal for scheduling SIB 1 PDSCH is defined for an NR BL UE.

The new signal may be either one of the following new signals 1 and 2.

[New Signal 1]

Some new signals may be defined instead of a Type0-PDCCH. When the scheduling flexibility of an SIB 1-BR is similar to that of the Type0-PDCCH, the effect of new signals is not clear.

Figure 7A:
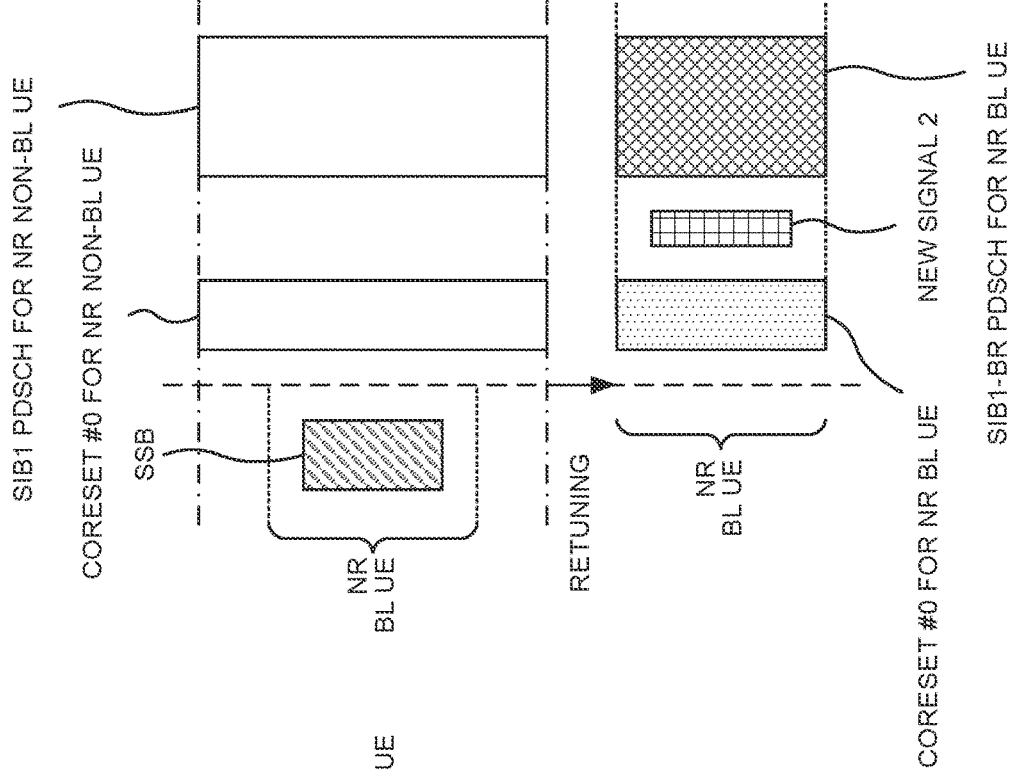
FIGS. 7A and 7B are diagrams to illustrate examples of case #4.

In an example of FIG. 7A, an NR non-BL UE and an NR BL UE share an SSB. The band of a new signal 1 and an SIB 1 PDSCH for the NR BL UE may be out of the band of CORESET #0 and an SIB 1 PDSCH for the NR non-BL UE. In this case, the NR BL UE may receive the SSB before RF retuning, and receive the new signal 1 and the SIB 1 PDSCH for the NR BL UE.

[New Signal 2]

In addition to an existing Type0-PDCCH, some new signals for SIB 1 (SIB-BR) PDSCH scheduling may be defined. At least for the purpose of power saving, a new signal 2 preferably indicates auxiliary information. For example, the auxiliary information may be an update notice of an SIB 1 (SIB 1-BR).

Figure 7B:
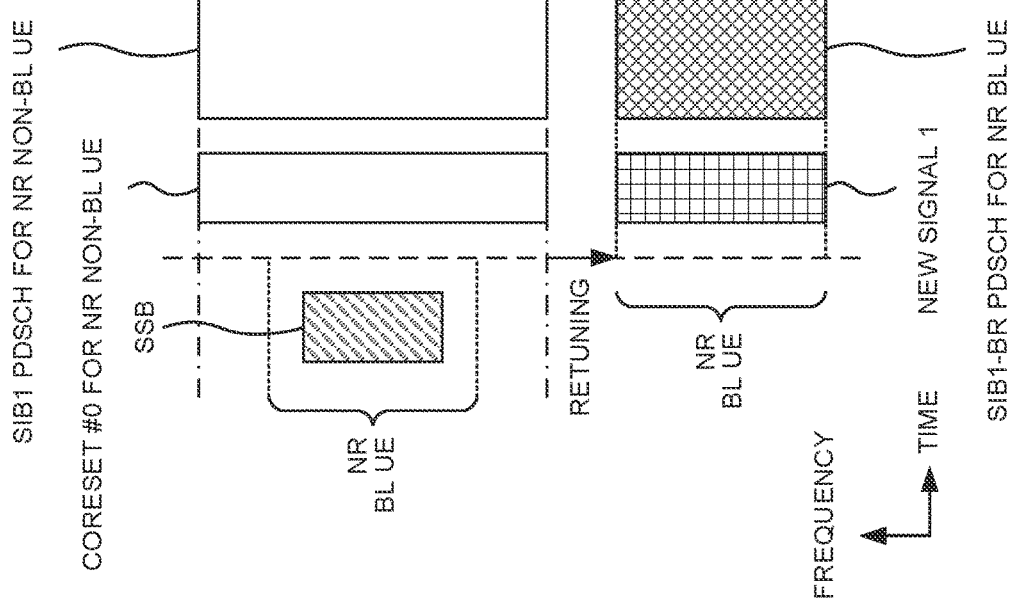

In an example of FIG. 7B, an NR non-BL UE and an NR BL UE share an SSB. The band of a Type0-PDCCH, the new signal 2 and an SIB 1 PDSCH for the NR BL UE may be out of the band of CORESET #0 and an SIB 1 PDSCH for the NR non-BL UE. In this case, the NR BL UE may receive the SSB before RF retuning, and receive the Type0-PDCCH, the new signal 2 and the SIB 1 PDSCH for the NR BL UE.

The new signals in case #4 will be described later in a third embodiment.

First Embodiment

The position of CORESET #0 for an NR BL UE (terminal) may be determined based on the position of second CORESET #0 for an NR non-BL UE (second terminal). The NR non-BL UE has at least one of a second bandwidth wider than a bandwidth of the NR BL UE and a second number of antennas greater than the number of antennas of the terminal.

With respect to case #3, the position of time/frequency of CORESET #0 for the NR BL UE may be based on the position of time/frequency of CORESET #0 for the NR non-BL UE, which is determined by scheduling information (PDCCH configuration information for an SIB 1, pdcch-ConfigSIB1) in an MIB.

The position of time/frequency of CORESET #0 for the NR BL UE may be according to any of the following positioning methods 1 to 3.

<<Positioning Method 1>>

The relative or absolute frequency position is defined in the specifications. The frequency position may be based on the lowest or highest subcarrier or PRB index of CORESET #0 for the NR BL UE.

Figures 8A, 8B:
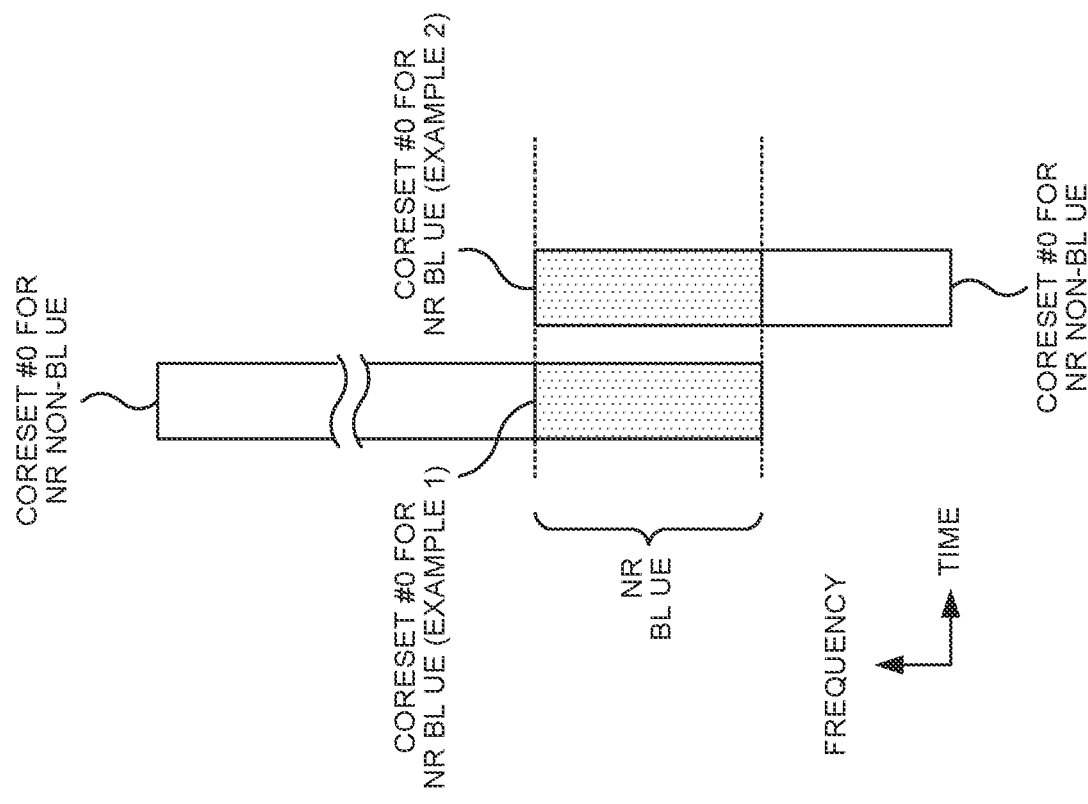
FIGS. 8A and 8B are diagrams to illustrate examples of a positioning method according to a first embodiment.

As in Example 1 of FIG. 8A, the highest frequency position of CORESET #0 for the NR BL UE may be equal to the lowest frequency position of CORESET #0 for the NR non-BL UE. As in Example 2 of FIG. 8A, the lowest frequency position of CORESET #0 for the NR BL UE may be equal to the highest frequency position of CORESET #0 for the NR non-BL UE. The lowest frequency position of CORESET #0 for the NR BL UE may be equal to the lowest frequency position of CORESET #0 for the NR non-BL UE. The highest frequency position of CORESET #0 for the NR BL UE may be equal to the highest frequency position of CORESET #0 for the NR non-BL UE.

The frequency position may be according to any of the following positioning methods 1-1 to 1-3.

[Positioning Method 1-1]

The frequency position is the relative frequency position defined between CORESET #0 for the NR BL UE and an SSB.

Figure 9:
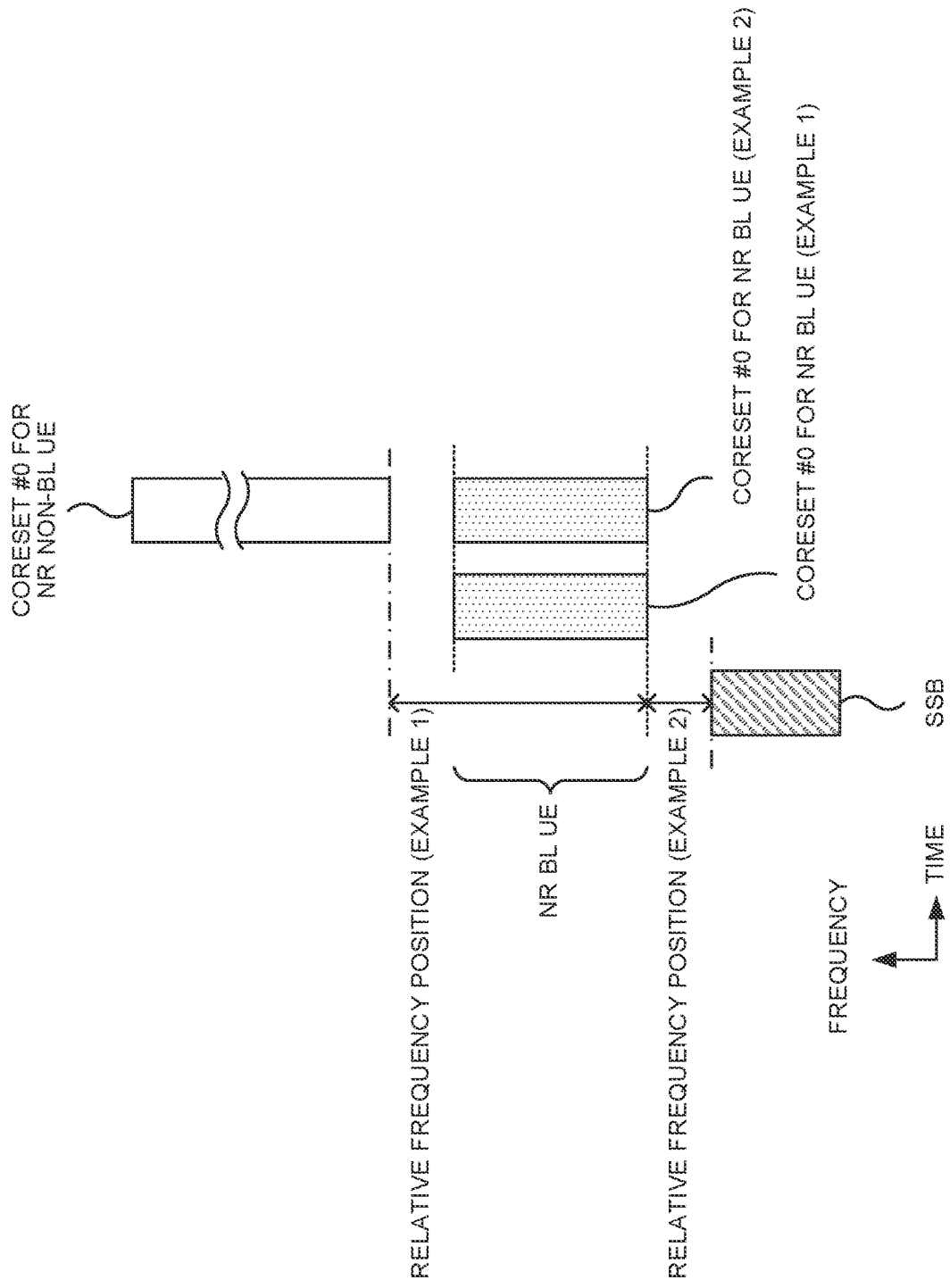
FIG. 9 is a diagram to illustrate an example of a positioning method 1.

In Example 1 of FIG. 9, the frequency position of CORESET #0 for the NR BL UE is defined by the difference between the highest frequency of the SSB and the lowest frequency of CORESET #0 for the NR BL UE.

[Positioning Method 1-2]

The frequency position is the relative frequency position defined between CORESET #0 for the NR BL UE and CORESET #0 for the NR non-BL UE.

In Example 2 of FIG. 9, the frequency position of CORESET #0 for the NR BL UE is defined by the difference between the lowest frequency of CORESET #0 for the NR non-BL UE and the lowest frequency of CORESET #0 for the NR BL UE.

[Positioning Method 1-3]

The frequency position is the absolute frequency position determined according to frequency-related parameters of at least one of the SSB and CORESET #0 for the NR non-BL UE.

Example 1

The absolute value of the frequency position may be defined in the specifications.

Example 2

A plurality of frequency position candidates may be defined in the specifications. The UE may assume that CORESET #0 for the NR BL UE is located at the nearest frequency position from the position of a CORESET or SSB monitored by the NR BL UE.

A "frequency-related parameter," an "Absolute Radio-Frequency Channel Number (ARFCN)," a "band number," a "position of SS/channel raster," a "SS SubCarrier Spacing (SCS)," and a "common SCS" may be interchangeably interpreted.

<<Positioning Method 2>>

A fixed pattern of the relative time position is defined. The time position may be based on the index of subframes, slots or symbols in CORESET #0 for the NR BL UE.

As in an example of FIG. 8B, the band of CORESET #0 for the NR BL UE may be equal to the band of CORESET #0 for the NR non-BL UE, and the relative time position of CORESET #0 for the NR BL UE may be defined with respect to the time position of CORESET #0 for the NR non-BL UE.

The time position may be according to any of the following positioning methods 2-1 and 2-2.

[Positioning Method 2-1]

The time position of a monitoring window for CORESET #0 of the NR BL UE may be obtained by time-shifting the time position of a monitoring window for CORESET #0 of the NR non-BL UE.

Figure 10:
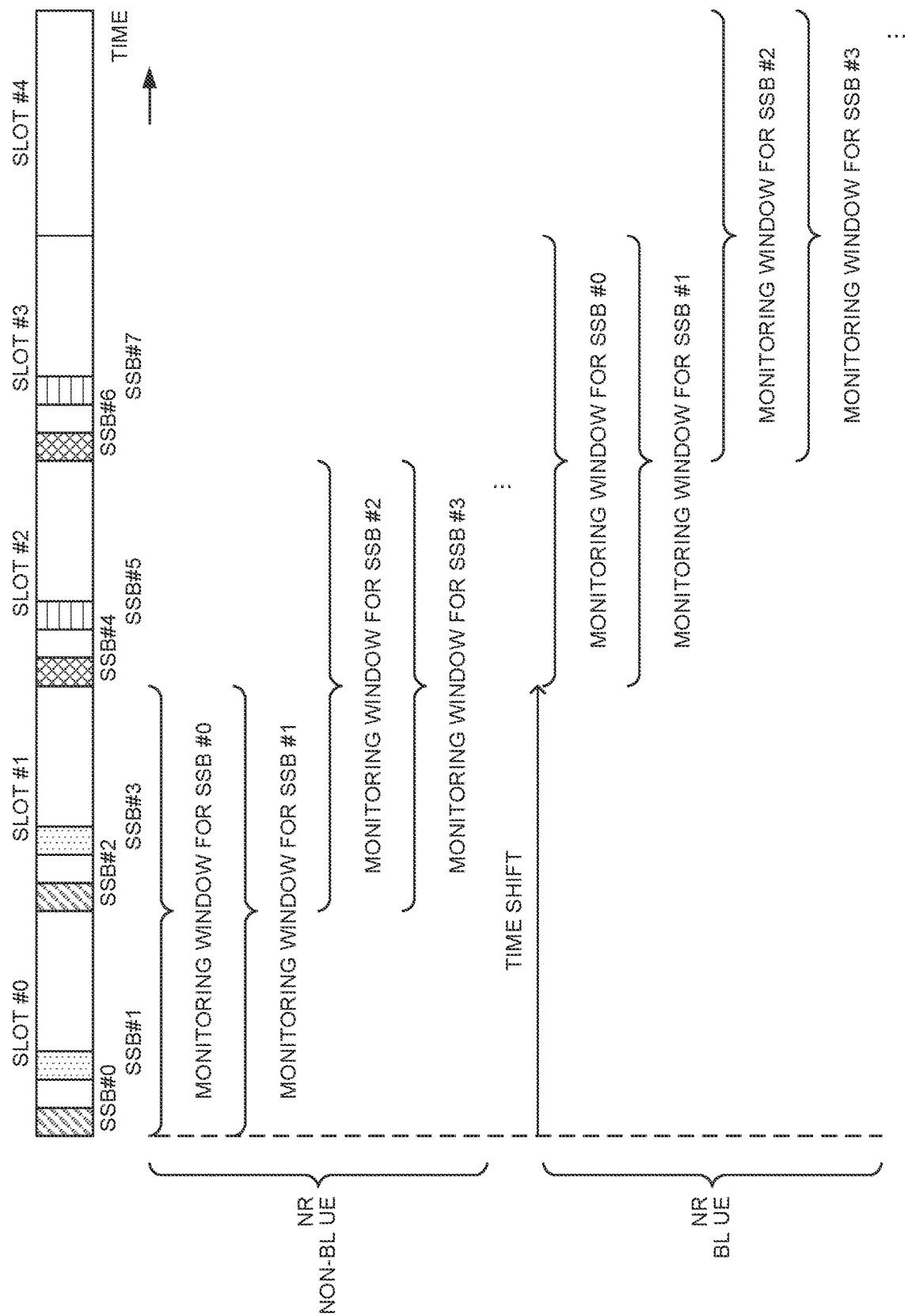
FIG. 10 is a diagram to illustrate an example of a positioning method 2-1.

In an example of FIG. 10, the monitoring window for CORESET #0 of the NR non-BL UE is two consecutive slots including a slot that received an SSB (MIB). Time offset for the monitoring window for CORESET #0 of the NR non-BL UE is two slots.

Time shift may be based on symbol levels, slot levels, or frame levels.

Regardless of a group offset indicated by the MIB, a different value of group offset O may be used for the NR BL UE. The group offset for the NR BL UE may be obtained by adding or multiplying a value of x to or by the group offset for CORESET #0 of the NR non-BL UE.

Figure 11:
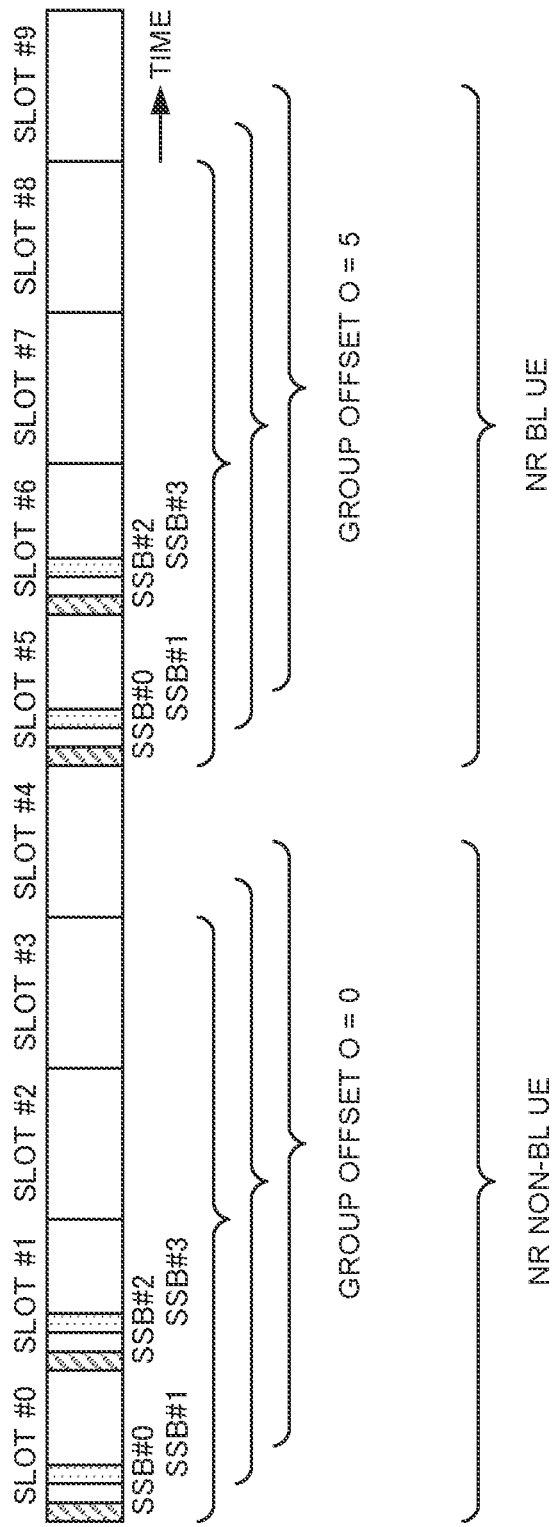
FIG. 11 is a diagram to illustrate another example of the positioning method 2-1.

In an example of FIG. 11, the group offset O for CORSET #0 of the NR non-BL UE is zero and the group offset O for the NR BL UE is five.

[Positioning Method 2-2]

The time length (duration) of a monitoring window for CORESET #0 of the NR BL UE may be obtained by shortening or extending the time length of a monitoring window for CORESET #0 of the NR non-BL UE.

Figure 12:
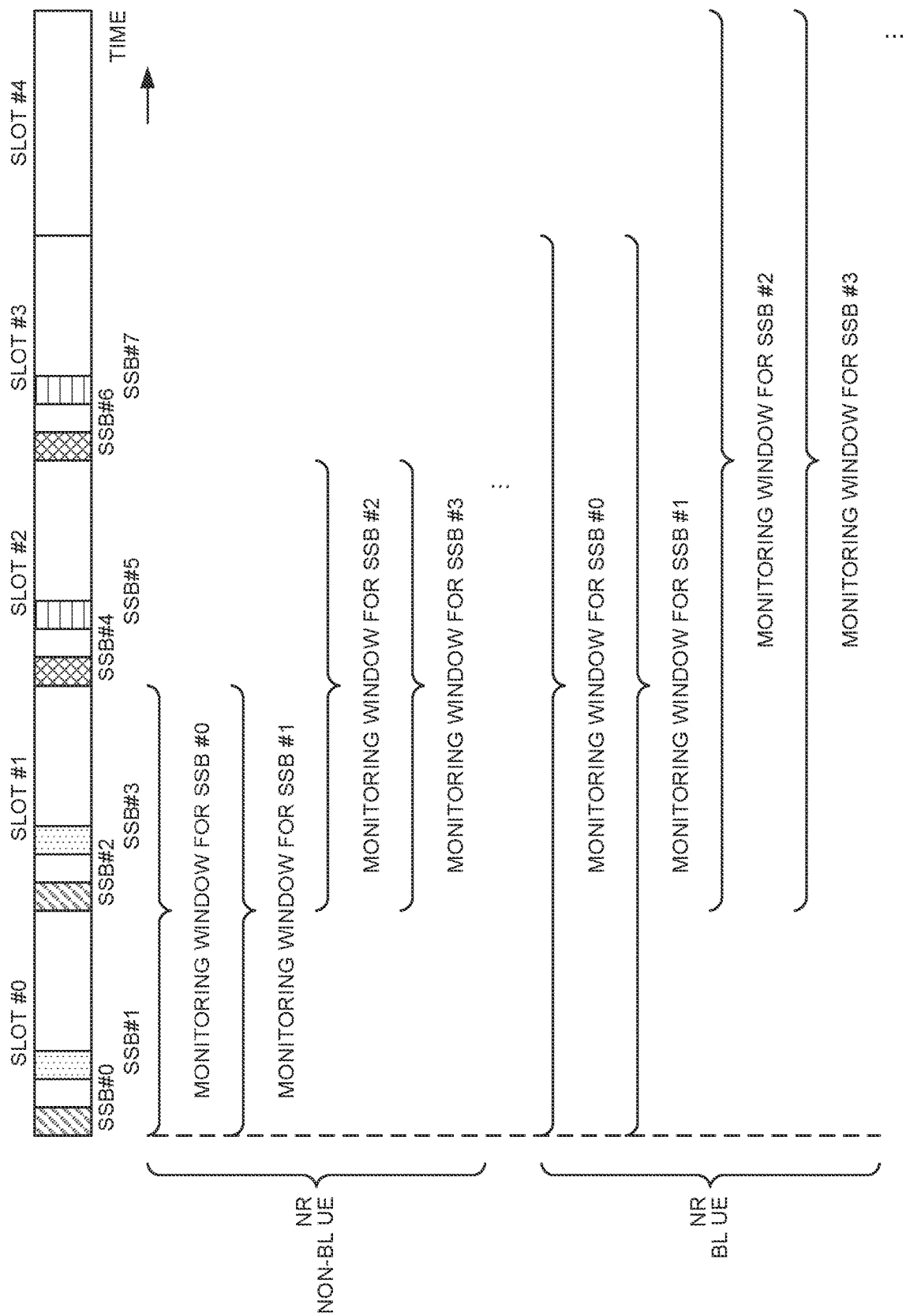
FIG. 12 is a diagram to illustrate an example of a positioning method 2-2.

In an example of FIG. 12, a monitoring window for CORESET #0 of an NR BL UE is two consecutive slots including a slot that received an SSB (MIB). The monitoring window for CORESET #0 of the NR non-BL UE is four consecutive slots from its start position.

<<Positioning Method 3>>

A combination of the positioning method 1 and the positioning method 2 is used. The position of time/frequency may be based on PDCCH configuration information for the SIB 1 in the MIB. Different UE procedures may be assumed. For example, when the SSB and CORESET #0 for the NR non-BL UE are Frequency Division Multiplexed (FDM), the UE may assume the positioning method 2. For example, when the SSB and CORESET #0 for the NR non-BL UE are Time Division Multiplexed (TDM), the UE may assume the positioning method 1.

<<Positioning Method 4>>

The position of time/frequency of CORESET #0 for an NR BL UE may be based on a UE bandwidth (size).

When a frequency bandwidth of CORESET #0 is equal to or below a UE bandwidth, it may be assumed that CORESET #0 is shared between an NR BL UE and an NR non-BL UE. Otherwise, the UE may assume that CORESET #0 for the NR BL UE and CORESET #0 for the NR non-BL UE are separately configured.

When multiple sizes of mandatory UE bandwidths (for example, 20, 40, 80 PRBs) for an NR BL UE are supported, the switching mechanism is effective.

Figure 13:
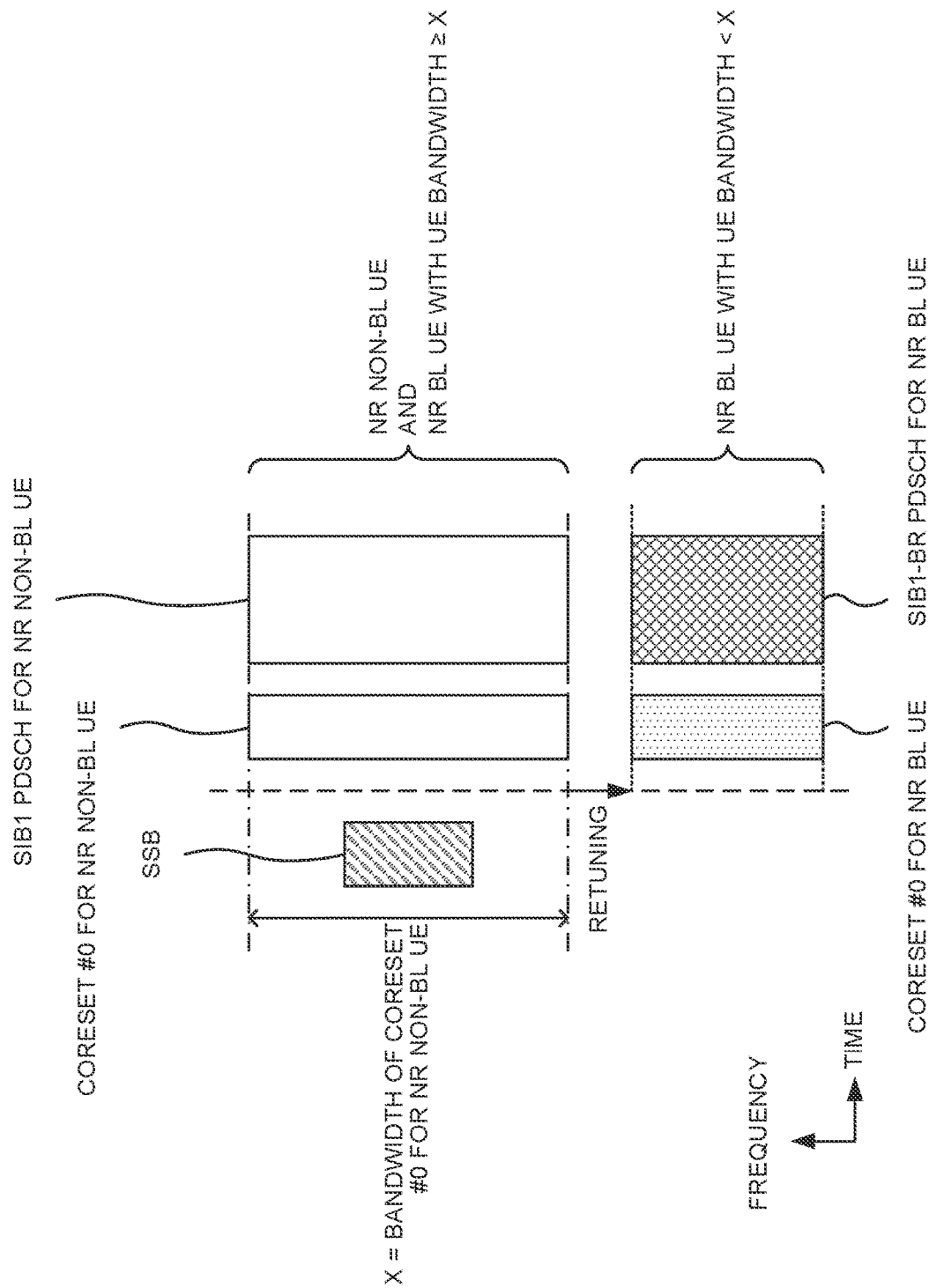
FIG. 13 is a diagram to illustrate an example of a positioning method 4.

In an example of FIG. 13, X is the bandwidth of CORESET #0 for an NR non-BL UE. The NR non-BL UE and an NR BL UE with a UE bandwidth equal to or above X receive CORESET #0 for the NR non-BL UE and an SIB 1 PDSCH for the NR non-BL UE.

An NR BL UE with a UE bandwidth below X may receive CORESET #0 for the NR BL UE and an SIB 1 PDSCH for the NR BL UE. The band of CORESET #0 for the NR BL UE and the SIB 1 PDSCH for the NR BL UE may be out of the band of CORESET #0 for the NR non-BL UE and the SIB 1 PDSCH for the NR non-BL UE. An NR BL UE with a UE bandwidth below X may receive an SSB, then perform RF retuning to the band of CORESET #0 for the NR BL UE, and receive CORESET #0 for the NR BL UE and the SIB 1 PDSCH for the NR BL UE.

<<Positioning Method 5>>

The position of time/frequency of CORESET #0 for the NR BL UE may be based on one bit (specific bit, specific field) in the MIB. The specific field may be a reserved bit.

The specific field may indicate the position of time/frequency of CORESET #0 for the NR BL UE. For example, one bit may indicate one of two position candidates of time/frequency of CORESET #0 for the NR BL UE.

The specific field may indicate which of the positioning methods 1 to 5 is to be set. For example, one bit may indicate one of two candidates among the positioning methods 1 to 5.

The NR BL UE/NR non-BL UE may assume that a common subcarrier spacing (SCS) (SCS in a PDCCH/SIB 1 in CORESET #0) is the same as an SCS of the SSB. Common SCS information (subCarrierSpacingCommon) may be used as the specific field.

According to the above first embodiment, the NR BL UE can appropriately determine the position of time frequency of CORESET #0.

Second Embodiment

<<Coverage Recovery in Initial Access Procedure of eMTC>>

In the eMTC initial access procedure of LTE, the following coverage recovery is supported for BL/CE UEs.

An MIB uses a fixed periodicity of 40 ms (generation periodicity, update periodicity, repeated transmission periodicity, Transmission Time Interval (TTI)). Four repetitions are made within 40 ms. One repetition is made in each radio frame (10 ms). Only in Time Division Duplex (TDD)/Frequency Division Duplex (FDD) systems which support BL UEs or UEs in CE and have a bandwidth wider than 1.4 MHZ, an additional repetition may be applied within 40 ms.

An SIB 1 uses a fixed periodicity of 80 ms. One repetition is made in a radio frame with a system frame number (SFN) mod 2 of 0.

An SIB 1-BR also uses a fixed periodicity of 80 ms. The repetition level within 80 ms may be set by the MIB for the BL UE.

As mentioned above, in eMTC, the repetition level of the SIB 1-BR may be set by the MIB. Then, it is a problem that, with respect to an NR BL UE, the NR MIB does not have plenty of reserved bits for scheduling the repetition level of the SIB 1-BR.

The NR BL UE (terminal) may determine a different periodicity than a second periodicity of at least one of a synchronization signal block (SSB), control resource set (CORESET) #0, a PDSCH carrying an SIB 1, an update of a PBCH in an SIB, and an update of the SIB 1, for an NR non-BL UE (second terminal), the NR non-BL UE having at least one of a second bandwidth wider than a bandwidth of the NR BL UE and a second number of antennas greater than the number of antennas of the terminal, and perform reception based on the periodicity.

Coverage recovery based on repetitions may be performed for the NR BL UE. The coverage recovery may be according to at least one of the following coverage recovery 1 and 2.

[Coverage Recovery 1]

An NR BL UE may assume a shorter or longer SSB periodicity than a SSB periodicity for an NR non-BL UE. The periodicity may be defined in the specifications, or may depend on UE implementation.

Figure 14:
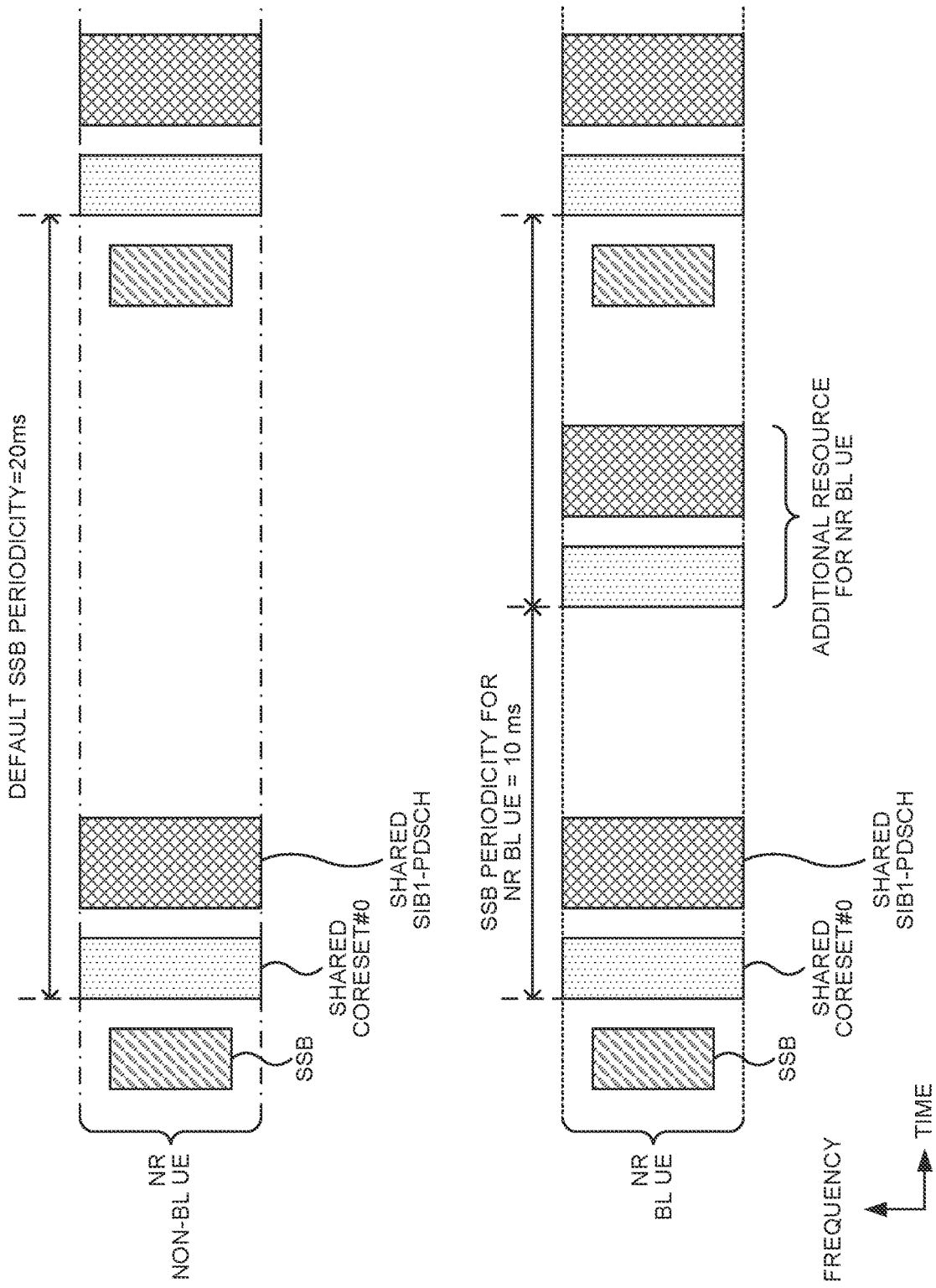
FIG. 14 is a diagram to illustrate an example of coverage recovery 1.

In an example of FIG. 14, a set of an SSB, CORESET #0 for an NR non-BL UE and an SIB 1 PDSCH for the NR non-BL UE is allocated for every default SSB periodicity of 20 ms. In addition, an additional resource for an NR BL UE is allocated between adjacent sets. The additional resource for the NR BL UE includes additional CORESET #0 and an additional SIB 1 PDSCH. The interval between multiple CORESET #0s (CORESET #0 periodicity for the NR BL UE, SSB periodicity for the NR BL UE), which include CORESET #0 for the NR non-BL UE and additional CORESET #0, is 10 ms.

The additional resource may be applied to any combination of an SSB, CORESET #0, and an SIB 1 (SIB 1-BR) PDSCH.

Figure 15:
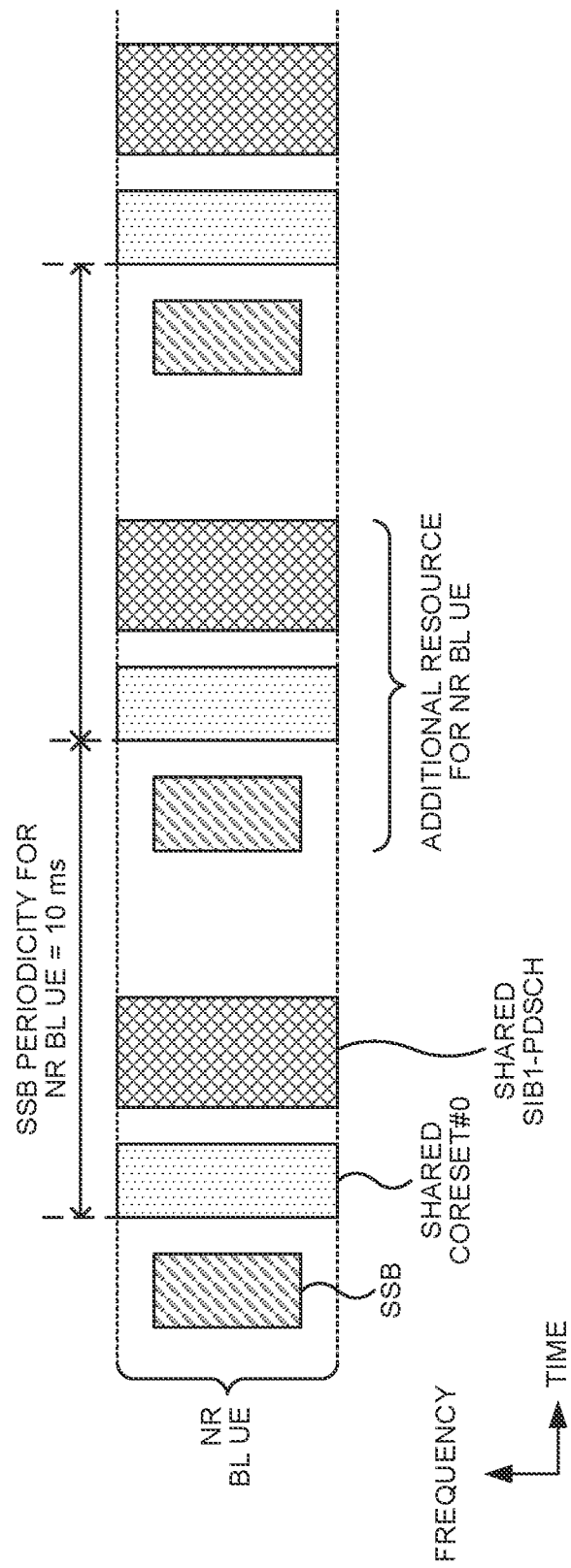
FIG. 15 is a diagram to illustrate another example of the coverage recovery 1.

In an example of FIG. 15, an additional resource for an NR BL UE includes an additional SSB, additional CORESET #0 and an additional SIB 1 PDSCH. The interval between multiple CORESET #0s (CORESET #0 periodicity for the NR BL UE, SSB periodicity for the NR BL UE), which include CORESET #0 for the NR non-BL UE and additional CORESET #0, is 10 ms.

The coverage recovery 1 may be according to any of the following coverage recovery 1-1 to 1-3.

[Coverage Recovery 1-1]

Frequency hopping may be applied for further performance improvement. This provides a frequency diversity effect.

Figure 16:
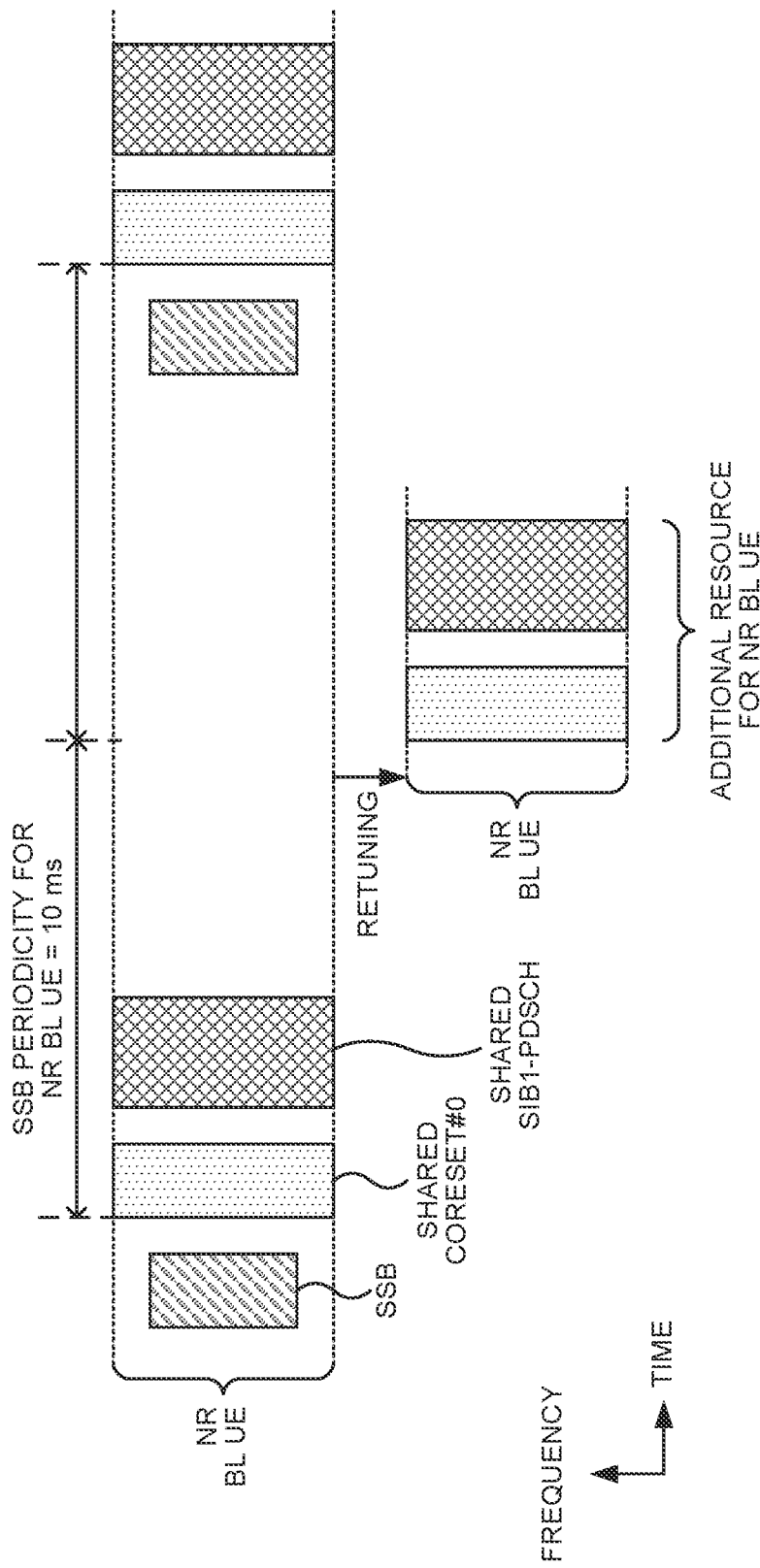
FIG. 16 is a diagram to illustrate an example of coverage recovery 1-1.

In an example of FIG. 16, the band of an additional resource is different from the band of an SSB, CORESET #0 and an SIB 1 PDSCH for an NR non-BL UE. An NR BL UE may perform RF retuning to the band of the additional resource after the SSB, CORESET #0 and the SIB 1 PDSCH for the NR non-BL UE, and then receive the additional resource.

[[Coverage Recovery 1-2]]

The indication of existence of the additional resource may be based on the detection of an additional SSB (SSB for the NR BL UE).

In this case, a UE may attempt to detect both an existing SSB and an additional SSB. When the additional SSB is detected, it may be assumed that the additional resource is set for the NR BL UE.

Figure 17:
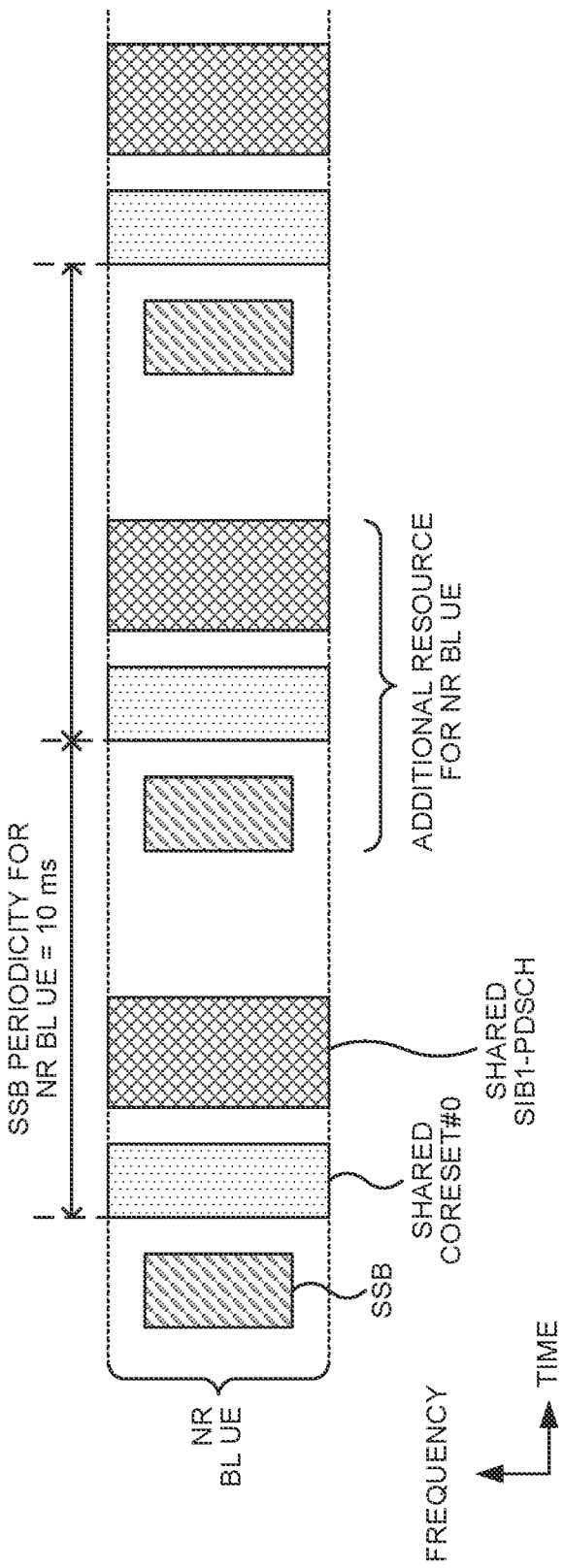
FIG. 17 is a diagram to illustrate an example of coverage recovery 1-2.

In an example of FIG. 17, an additional resource for an NR BL UE includes an additional SSB, additional CORESET #0 and an additional SIB 1 PDSCH. The interval between multiple CORESET #0s (CORESET #0 periodicity for the NR BL UE, SSB periodicity for the NR BL UE), which include CORESET #0 for the NR non-BL UE and additional CORESET #0, is 10 ms.

In this case, the additional SSB may be different from the existing SSB in at least one of the sequence, time position and frequency position.

[[Coverage Recovery 1-3]]

The indication of existence of an additional resource may be set by one bit indication in an MIB.

[Coverage Recovery 2]

It may be assumed that an NR BL UE has a TTI (payload generation periodicity, repetition transmission periodicity) of at least one of an SSB (PBCH, MIB) and CORESET #0 different from the existing TTI.

In existing NR, the SSB TTI is defined as 80 ms. As SSB transmission periodicity is 20 ms, up to four SSBs may be soft-combined for improving SSB detecting performance.

In the coverage recovery 2, the NR BL UE may assume a longer (shorter) TTI for an SSB/CORESET #0. For example, the NR BL UE may assume a longer TTI for an SSB/CORESET #0, and the UE may improve detecting performance at the cost of periodic updates.

According to the above second embodiment, even when the bandwidth in an initial access is narrow, coverage can be improved.

Third Embodiment

An NR BL UE may receive a signal (for example, new signal, SIB1 WUS) different from a Type0-PDCCH, and based on the signal, determine reception of at least one of CORESET #0 and a PDSCH carrying an SIB 1.

In addition to an existing Type0-PDCCH, a new signal may be defined. In the present disclosure, a "new signal" and an "SIB 1 wakeup signal (WUS)" may be interchangeably interpreted. The new signal may be according to one of the following new signals 1 and 2.

[New Signal 1]

Some new signals may be defined instead of a Type0-PDCCH.

[New Signal 2]

In addition to an existing Type0-PDCCH, some new signals for SIB 1 (SIB-BR) PDSCH scheduling may be defined.

The following may be applied to both of the new signals 1 and 2.

Part of information indicated through Type0-PDCCH Common Search Space (CSS) may be indicated by the SIB 1 WUS. In NW operation using NR BL UEs, as information bits indicated by an SIB 1 WUS is restricted, the flexibility of SIB 1 (SIB-BR) scheduling is limited. For example, when an operator wants to configure the SIB1 WUS, resource allocation of time/frequency of the SIB 1 PDSCH is limited, and in the specifications, candidates for the resource allocation are fixed.

In other words, for improving SIB 1 PDCCH performance, the SIB1 WUS may be all or part of a copy of the SIB 1 PDCCH. In other words, the same information as that indicated by the SIB1 PDCCH may be indicated by the SIB 1 WUS.

For the purpose of power saving, at least one of System Information (SI) updates, and Earthquake and Tsunami Warning System (ETWS)/Commercial Mobile Alert Service (CMAS) notices may be based on the SIB1 WUS.

The SIB1 WUS may indicate whether the monitoring of the Type0-PDCCH is required or not. The SIB1 WUS may indicate whether the SIB 1 changes during a given period or not.

For example, when a UE detects an SIB1 WUS indicating that the SIB 1 does not change during a given period, the UE may assume that the monitoring of the Type0-PDCCH is not required.

For example, when the UE detects an SIB1 WUS indicating that the SIB 1 does not change during a given period, the UE may assume that the monitoring of the SIB 1 (SIB-BR) PDSCH is not required.

The frequency position and time position of the new signal may be notified by higher layer signaling, or may be fixed (defined) by the specifications. Moreover, the position may be defined by the difference from an SSB, CORESET #0 or an SIB1 PDSCH, or may be fixed (defined) by the specifications.

Figure 18:
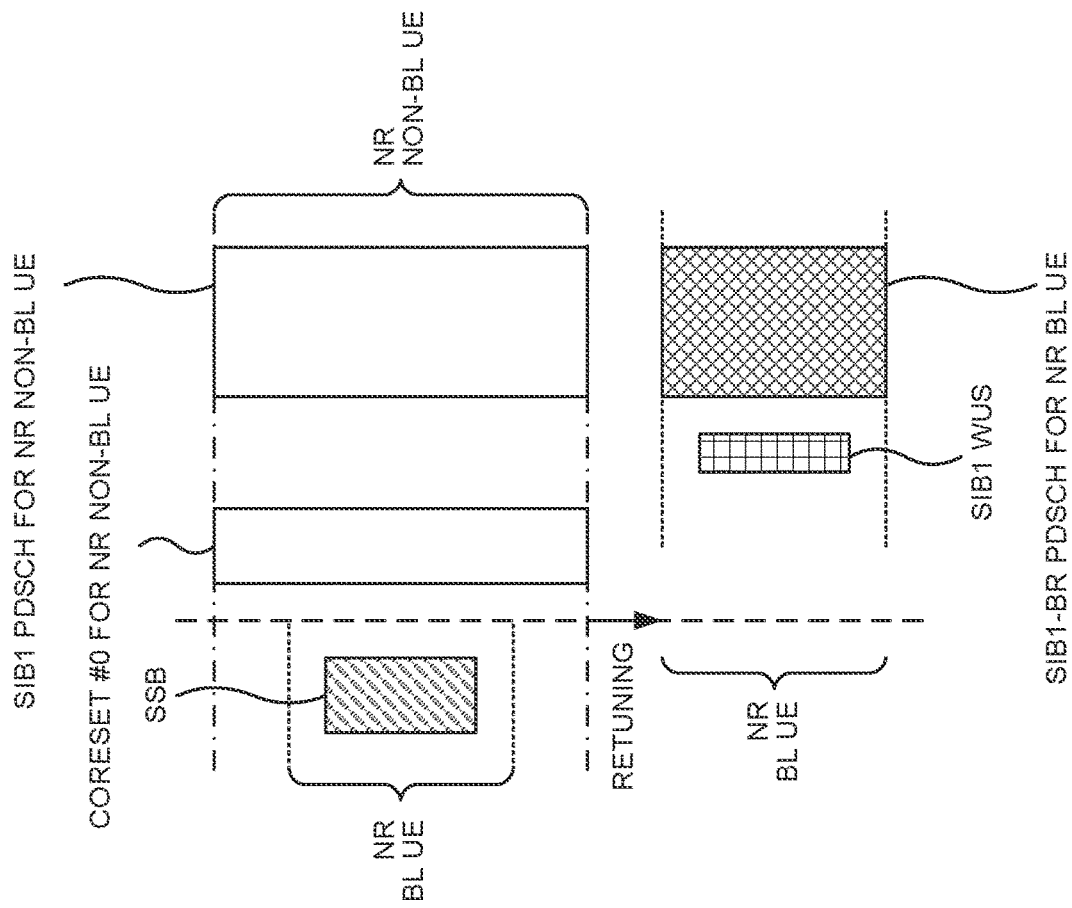
FIG. 18 is a diagram to illustrate an example of a new signal 1.

In an example of FIG. 18, an NR BL UE may receive an SIB1 WUS in response to the reception of an SSB. The NR BL UE may not receive a Type0-PDCCH. The NR BL UE may receive SIB 1-BR PDSCH based on the SIB1 WUS. An SIB 1-BR PDSCH may be scheduled by the SIB1 WUS.

A band of the SIB1 WUS and the SIB 1-BR PDSCH for the NR BL UE may be different from a band of CORESET #0 and an SIB 1 PDSCH for an NR non-BL UE.

Figure 19A:
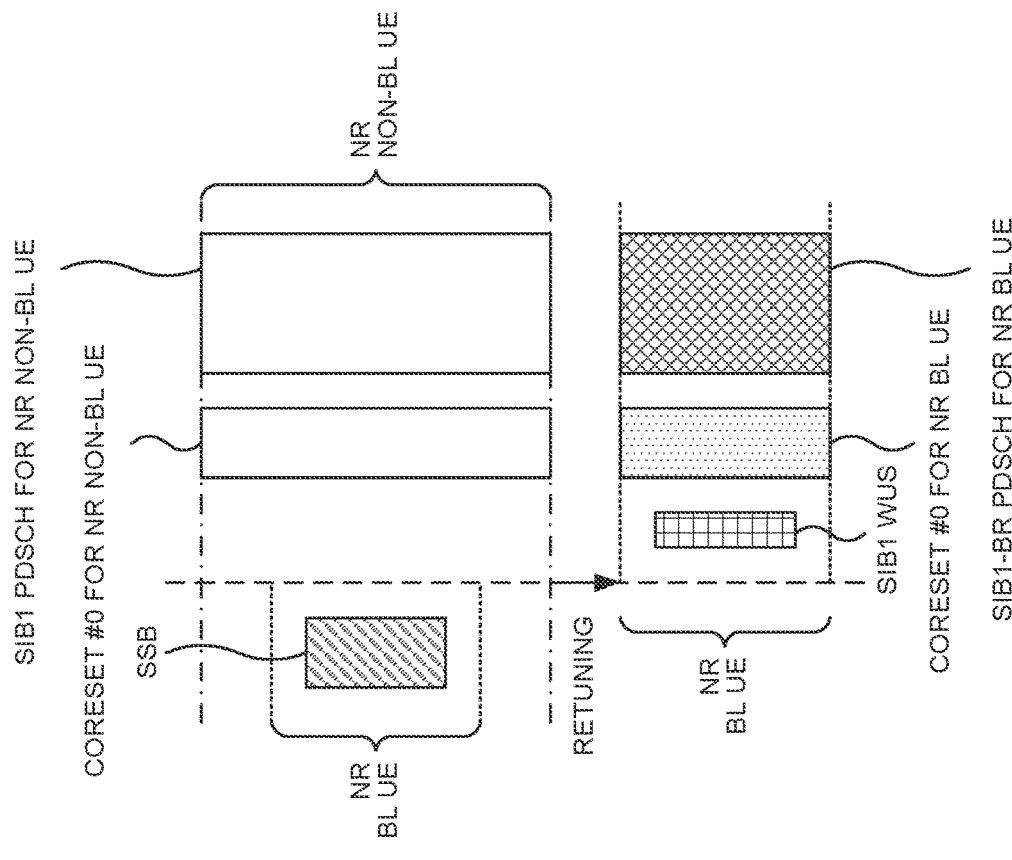
FIGS. 19A and 19B are diagrams to illustrate examples of a new signal 2.

In an example of FIG. 19A, an NR BL UE may receive at least one of a Type0-PDCCH in CORESET #0 and an SIB1 WUS in response to the reception of an SSB. An SIB 1-BR PDSCH may be scheduled by at least one of the Type0-PDCCH and the SIB1 WUS.

The SIB1 WUS may be TDMed with CORESET #0. The SIB1 WUS may be transmitted after CORESET #0 and before the SIB 1-BR PDSCH.

Figure 19B:
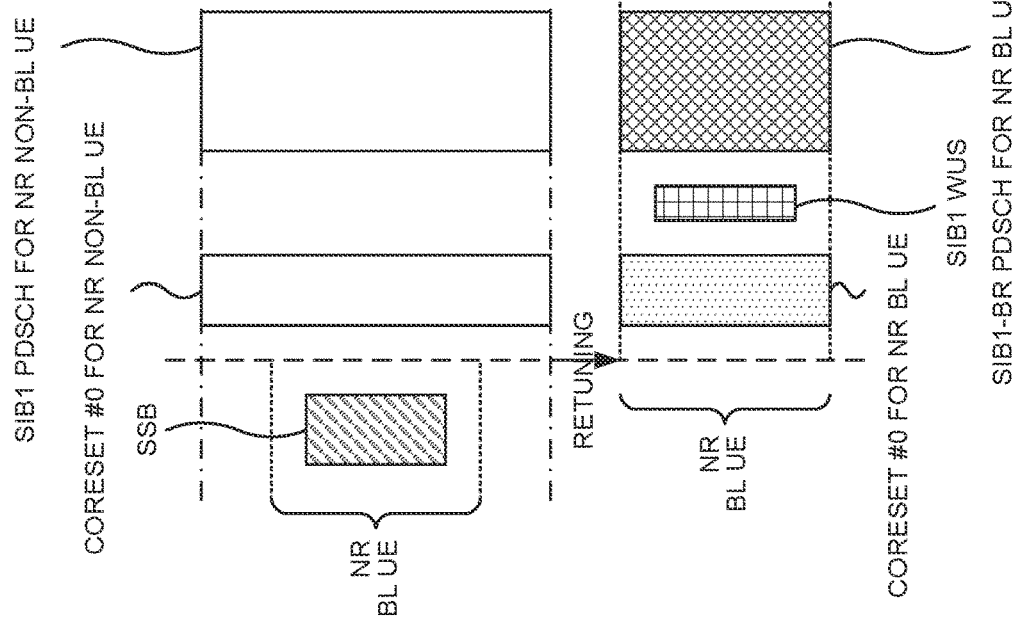

In an example of FIG. 19B, an NR BL UE may receive at least one of a Type0-PDCCH in CORESET #0 and an SIB1 WUS in response to the reception of an SSB. An SIB 1-BR PDSCH may be scheduled by at least one of the Type0-PDCCH and the SIB1 WUS.

The SIB1 WUS may be TDMed with CORESET #0. The SIB1 WUS may be transmitted after the SSB and before CORESET #0.

According to the above third embodiment, an NR BL UE can save power by not monitoring at least one of a Type0-PDCCH and an SIB 1 PDSCH.

(Radio Communication System)

Hereinafter, a structure of a radio communication system according to one embodiment of the present disclosure will be described. In this radio communication system, any of the radio communication methods according to each embodiment of the present disclosure described above may be used alone or may be used in combination for communication.

Figure 20:
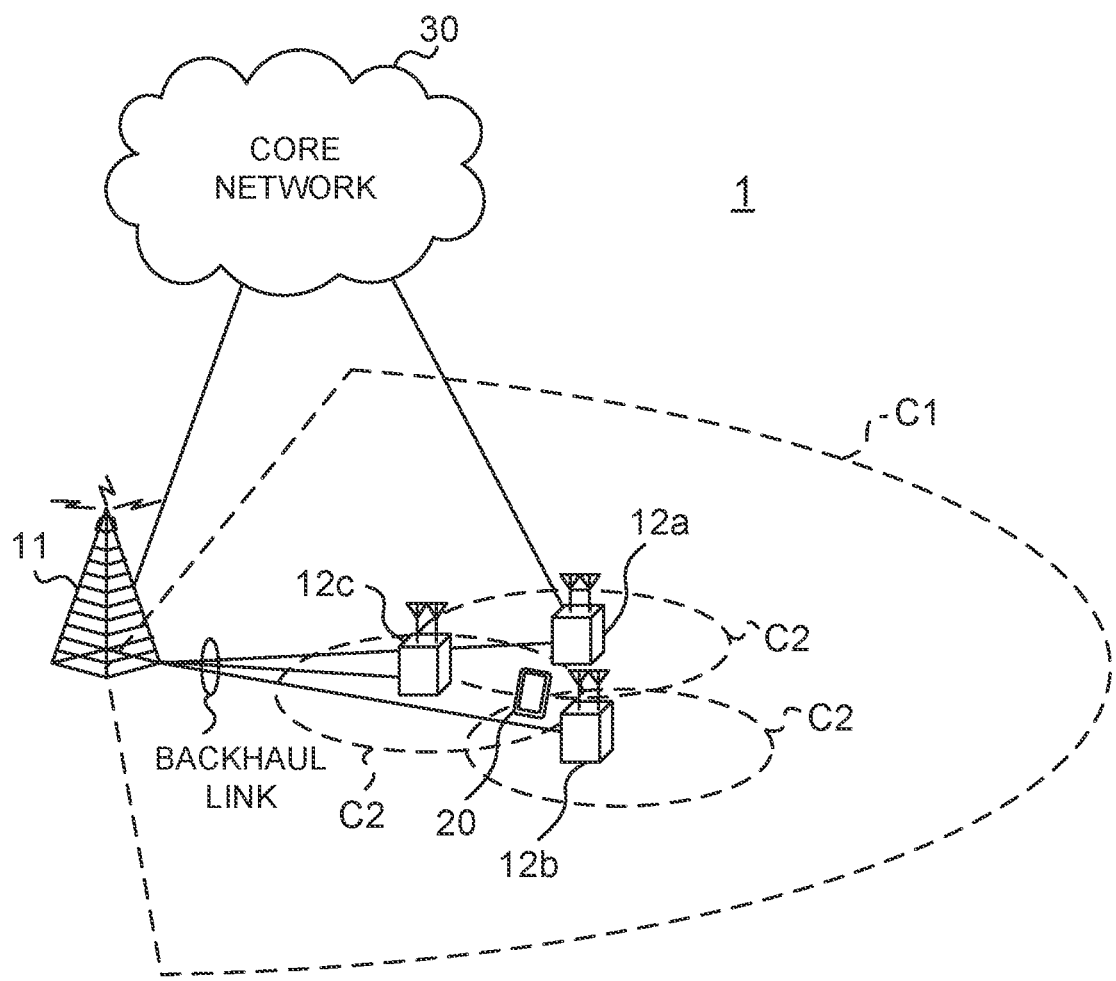
FIG. 20 is a diagram to illustrate an example of a schematic structure of a radio communication system according to one embodiment.

FIG. 20 is a diagram to illustrate an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect illustrated in the diagram. Hereinafter, the base stations 11 and 12 will be collectively referred to as "base stations 10," unless specified otherwise.

The user terminal 20 (for example, NR-Light device) may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHZ), and FR2 may be a frequency band which is higher than 24 GHZ (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set."

Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link."

In addition, various channels may be expressed without adding "Physical" to the head. In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 21:
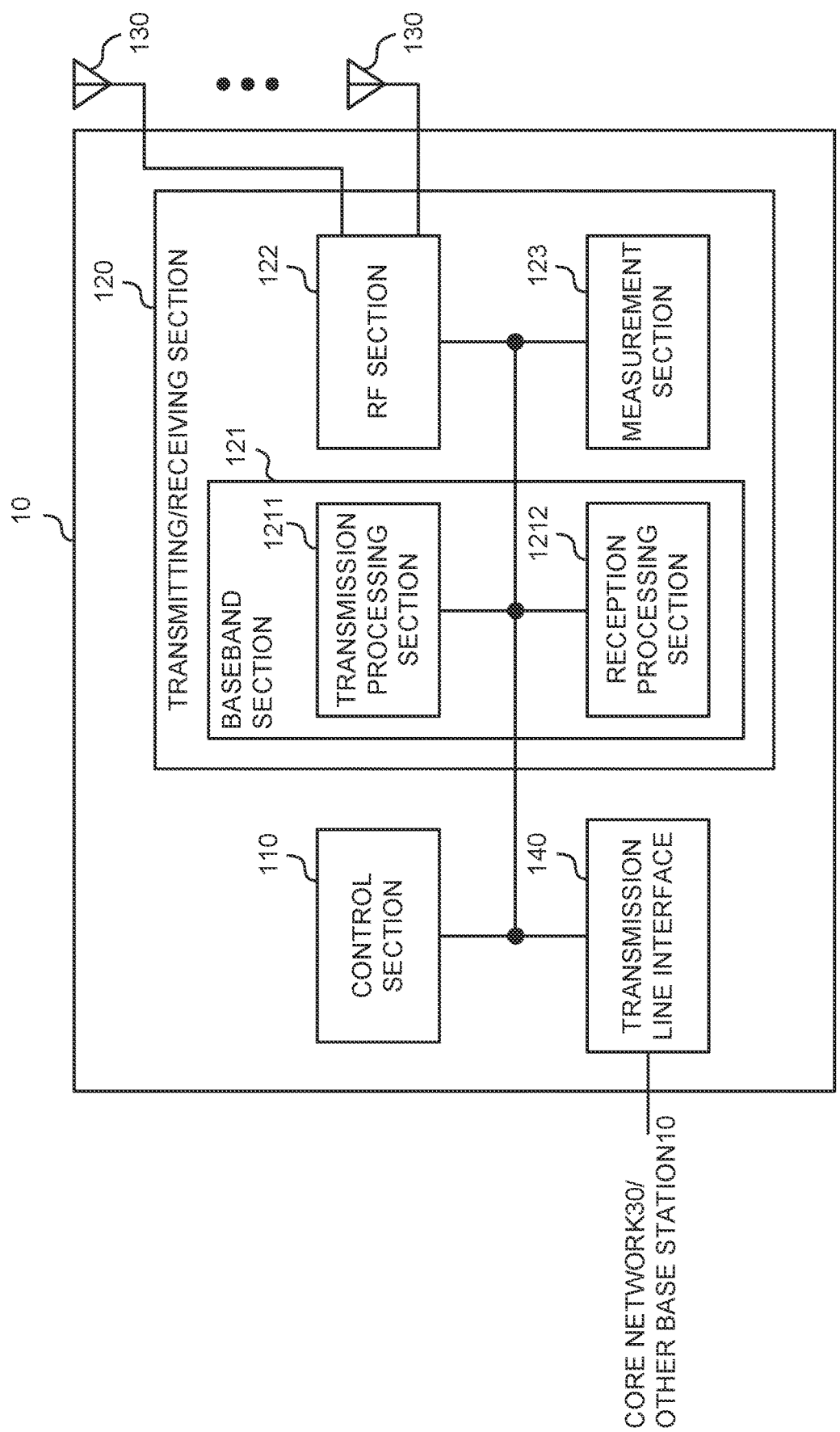
FIG. 21 is a diagram to illustrate an example of a structure of a base station according to one embodiment.

FIG. 21 is a diagram to illustrate an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily illustrates functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The control section 110 may determine the position of a control resource set (CORESET) 0 for a terminal based on the position of a second CORESET 0 for a second terminal. The second terminal has at least one of a second bandwidth wider than a bandwidth of the terminal 20 and a second number of antennas greater than the number of antennas of the terminal. The transmitting/receiving section 120 may transmit a physical downlink control channel in CORESET 0.

The control section 110 may determine a periodicity different from a second periodicity for at least one of a synchronization signal block, a control resource set (CORESET) 0, a physical downlink shared channel for carrying a system information block 1, an update of a physical broadcast channel in the synchronization signal block, and an update of the system information block 1, for a second terminal. The second terminal has at least one of a second bandwidth wider than a bandwidth of the terminal 20 and a second number of antennas greater than the number of antennas of the terminal. The transmitting/receiving section 120 may perform transmission based on the periodicity.

The control section 110 may generate a signal different from a Type0-Physical Downlink Control CHannel (PDCCH) based on at least one of the Type0-PDCCH and a Physical Downlink Shared CHannel (PDSCH) carrying the system information block 1. The transmitting/receiving section 120 may transmit the signal.

(User Terminal)

Figure 22:
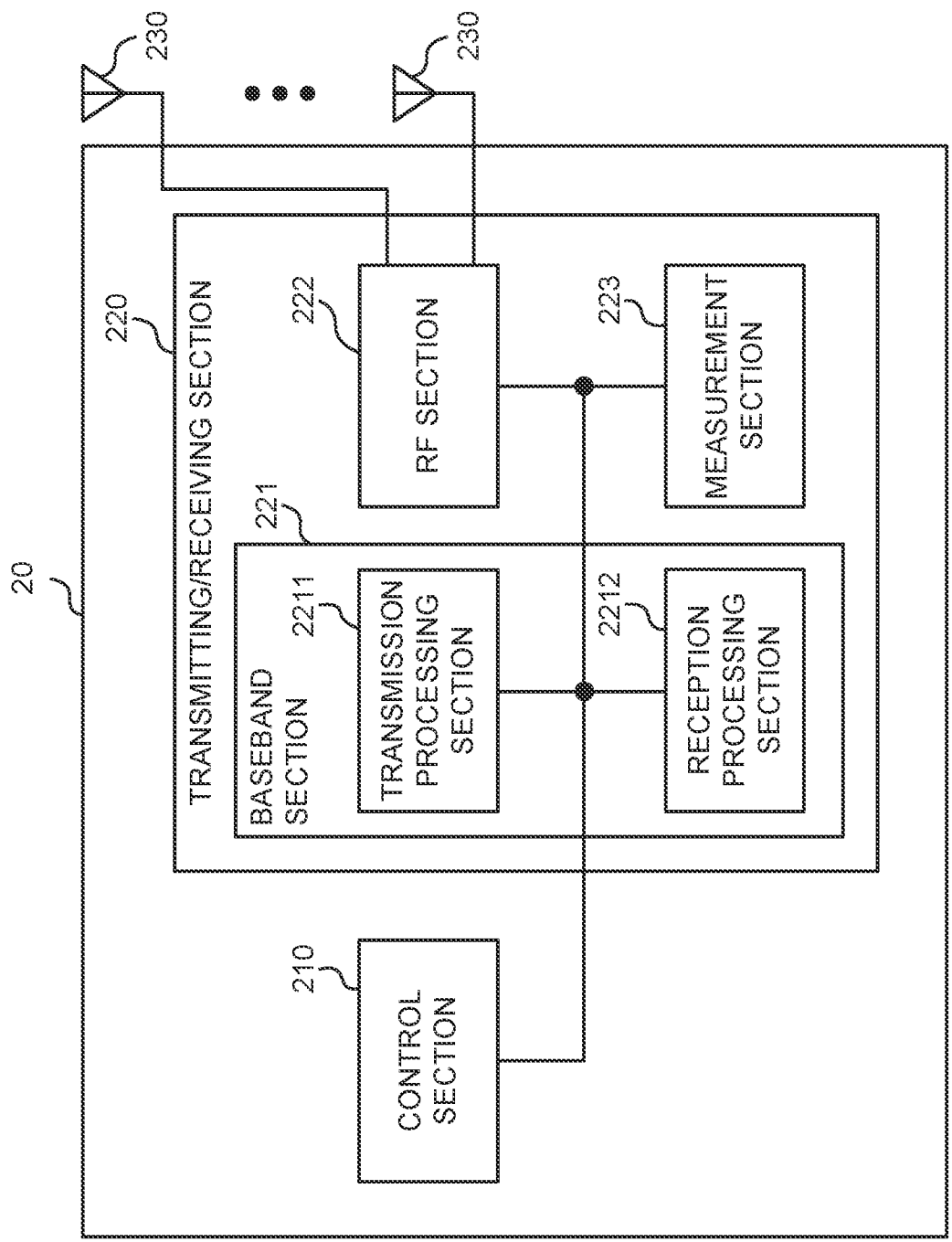
FIG. 22 is a diagram to illustrate an example of a structure of a user terminal according to one embodiment.

FIG. 22 is a diagram to illustrate an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily illustrates functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The control section 210 may determine the position of a control resource set (CORESET) 0 for a terminal 20 based on the position of a second CORESET 0 for a second terminal. The second terminal has at least one of a second bandwidth wider than a bandwidth of the terminal 20 and a second number of antennas greater than the number of antennas of the terminal. The transmitting/receiving section 220 may receive a physical downlink control channel in CORESET 0.

The control section 210 may determine the position of a CORESET based on at least one of the relative or absolute frequency position and the relative time position, and the position of a second CORESET.

The control section 210 may determine the position of the CORESET based on the bandwidth.

The control section 210 may determine the position of the CORESET based on one bit in a Master Information Block (MIB).

The control section 210 may determine a periodicity different from a second periodicity of at least one of a synchronization signal block, a control resource set (CORESET) 0, a physical downlink shared channel for carrying a system information block 1, an update of a physical broadcast channel in the synchronization signal block, and an update of the system information block 1, for a second terminal. The second terminal has at least one of a second bandwidth wider than a bandwidth of the terminal 20 and a second number of antennas greater than the number of antennas of the terminal. The transmitting/receiving section 220 may perform reception based on the periodicity.

The control section may determine a resource having the periodicity shorter than the second periodicity of a second resource for at least one of the synchronization signal block, CORESET 0, and the physical downlink shared channel.

The resource may be allocated between time intervals of the two adjacent second resources.

The periodicity may be longer than a second periodicity of at least one of an update of the physical broadcast channel and an update of the system information block 1.

The transmitting/receiving section 220 may receive a signal different from a Type0-Physical Downlink Control CHannel (PDCCH). The control section 210 may determine the reception of at least one of the Type0-PDCCH and a Physical Downlink Shared CHannel (PDSCH) carrying a system information block 1, based on the signal.

The receiving section may not monitor the Type0-PDCCH.

The control section may receive the PDSCH based on the Type0-PDCCH and the signal.

The signal may indicate whether the system information block 1 changes during a given period or not.

(Hardware Structure)

Note that the block diagrams that have been used to describe the above embodiments illustrate blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 23:
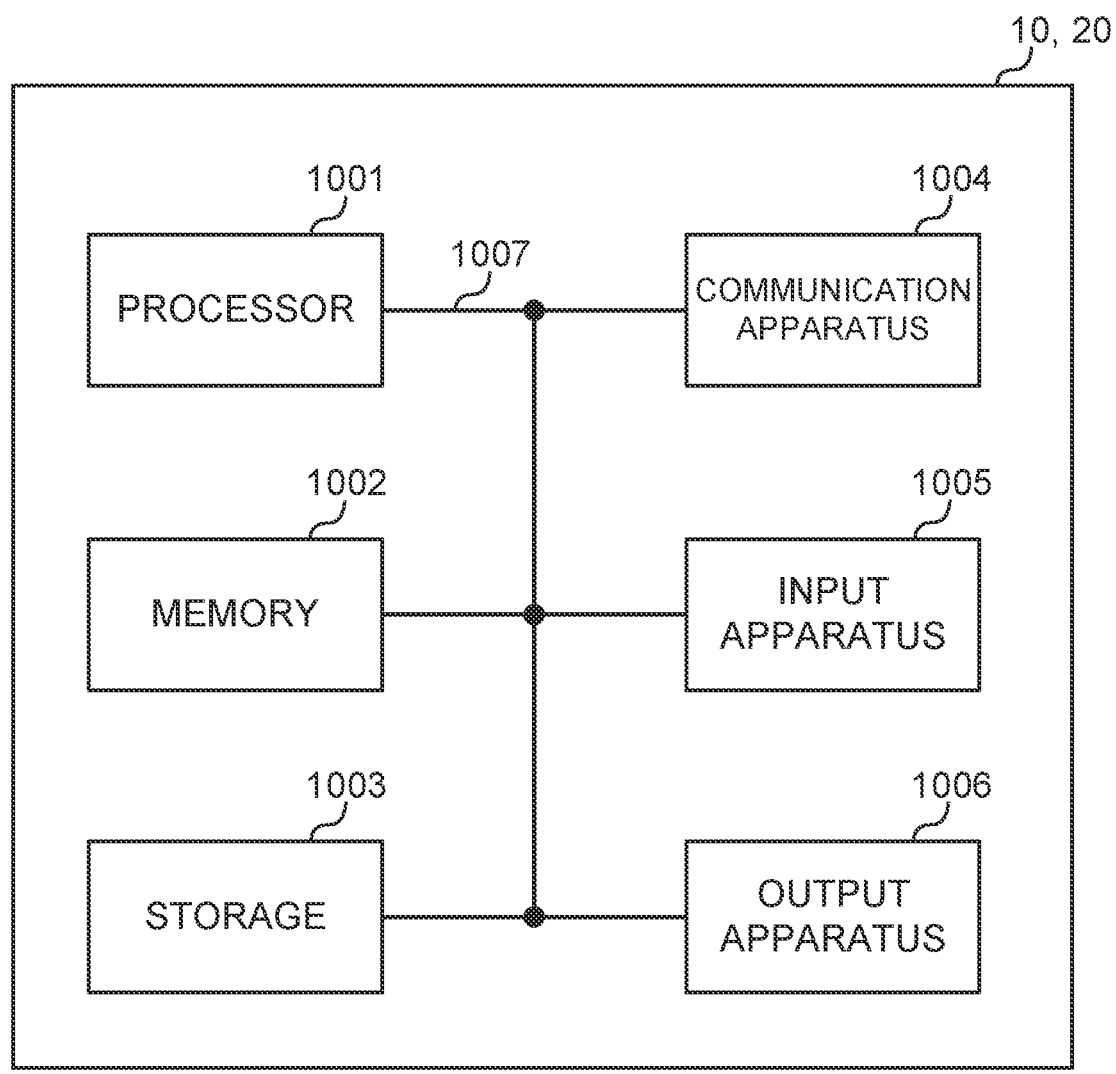
FIG. 23 is a diagram to illustrate an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 23 is a diagram to illustrate an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses illustrated in the drawings, or may be configured not to include part of apparatuses.

For example, although only one processor 1001 is illustrated, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a Floppy® disk, a magneto-optical disk (for example, a compact disc (Compact Disc ROM (CD-ROM) and so on), a digital versatile disc, a Blu-ray® disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages."

A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe."

Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot."

A mini-slot may be constituted of symbols less than the number of slots. A PDSCH (or PUSCH) transmitted in a time unit larger than a mini-slot may be referred to as "PDSCH (PUSCH) mapping type A."

A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI."

That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input/output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM®), CDMA 2000, Ultra Mobile Broadband (UMB), IEEE 802.11 (Wi-Fi®), IEEE 802.16 (WiMAX®), IEEE 802.20, Ultra-WideBand (UWB), Bluetooth®, systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C."

The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a control section that determines a periodicity different from a second periodicity of at least one of
        a synchronization signal block,
        a control resource set (CORESET) 0,
        a physical downlink shared channel for carrying a system information block 1,
        an update of a physical broadcast channel in the synchronization signal block, and
        an update of the system information block 1, for a second terminal, the second terminal having at least one of a second bandwidth wider than a bandwidth of the terminal and a second number of antennas greater than a number of antennas of the terminal,
    wherein the control section determines a resource having the periodicity shorter than the second periodicity of a second resource for at least one of the synchronization signal block, the CORESET 0, and the physical downlink shared channel; and
    a receiving section that performs reception based on the periodicity.

2. The terminal according to claim 1, wherein the resource is allocated between time intervals of the two adjacent second resources.

3. The terminal according to claim 1, wherein the periodicity is longer than a second periodicity of at least one of the update of the physical broadcast channel and the update of the system information block 1.

4. A radio communication method for a terminal, the radio communication method comprising:
    determining a periodicity different from a second periodicity of at least one of
        a synchronization signal block,
        a control resource set (CORESET) 0,
        a physical downlink shared channel for carrying a system information block 1,
        an update of a physical broadcast channel in the synchronization signal block, and
        an update of the system information block 1, for a second terminal, the second terminal having at least one of a second bandwidth wider than a bandwidth of the terminal and a second number of antennas greater than a number of antennas of the terminal;
    determining a resource having the periodicity shorter than the second periodicity of a second resource for at least one of the synchronization signal block, the CORESET 0, and the physical downlink shared channel; and
    performing reception based on the periodicity.

5. A base station system comprising:
    a base station in radio communication with a first terminal;
    wherein the first terminal comprises:
        a control section that determines a periodicity different from a second periodicity of at least one of
            a synchronization signal block,
            a control resource set (CORESET) 0,
            a physical downlink shared channel for carrying a system information block 1,
            an update of a physical broadcast channel in the synchronization signal block, and
            an update of the system information block 1, for a second terminal, the second terminal having at least one of a second bandwidth wider than a bandwidth of the first terminal and a second number of antennas greater than a number of antennas of the first terminal,
        wherein the control section determines a resource having the periodicity shorter than the second periodicity of a second resource for at least one of the synchronization signal block, the CORESET 0, and the physical downlink shared channel; and
        a receiving section that performs reception based on the periodicity,
    wherein the base station comprises a transmitting section that performs transmission based on the periodicity.

* * * * *